US005974547A

United States Patent [19]
Klimenko

[11] Patent Number: 5,974,547
[45] Date of Patent: Oct. 26, 1999

[54] TECHNIQUE FOR RELIABLE NETWORK BOOTING OF AN OPERATING SYSTEM TO A CLIENT COMPUTER

[75] Inventor: Yevgeniy Klimenko, Toronto, Canada

[73] Assignee: 3Com Corporation, Santa Clara, Calif.

[21] Appl. No.: 09/045,577

[22] Filed: Mar. 20, 1998

[51] Int. Cl.[6] .................................................. G06F 13/00
[52] U.S. Cl. .......................... 713/2; 713/100; 709/217; 709/220
[58] Field of Search ..................... 713/1, 2, 100; 709/220, 221, 222–228, 203, 217, 223, 224

[56] References Cited

U.S. PATENT DOCUMENTS

| | | | |
|---|---|---|---|
| 5,280,627 | 1/1994 | Flaherty et al. | 395/700 |
| 5,404,527 | 4/1995 | Irwin et al. | 395/700 |
| 5,574,915 | 11/1996 | Lemon et al. | 395/700 |
| 5,577,210 | 11/1996 | Abdous et al. | 709/200 |
| 5,644,714 | 7/1997 | Kikinis | 709/200 |
| 5,689,708 | 11/1997 | Regnier et al. | 709/302 |
| 5,842,011 | 9/1995 | Basu | 713/2 |
| 5,893,106 | 7/1997 | Brobst et al. | 707/102 |

OTHER PUBLICATIONS

P. Miller, *TCP/IP Explained* (© 1997, Digital Press), specifically Chapter 9, "Booting Internet Hosts with BootP and TFTP", pp. 343–359.

W. R. Stevens, *TCP/IP Illustrated, vol. 1—The Protocols* (© 1994, Addison–Wesley Inc.), specifically Chapter 16, "BOOTP: Bootstrap Protocol", pp. 215–222.

*Primary Examiner*—Joseph E. Palys
*Assistant Examiner*—Rijue Mai
*Attorney, Agent, or Firm*—Michaelson & Wallace; Peter L. Michaelson

[57] ABSTRACT

A technique, specifically apparatus and accompanying methods, for use in a client-server environment for booting an operating system (O/S), such as a 32-bit personal computer (PC) O/S, on a client computer through a networked connection to a server. Specifically, the server stores an image of a client hard disk including the client O/S and desired applications. During a boot process, a procedure, which is compliant with both an interrupt handler in the client and a network driver kernel in the client O/S, is installed in the client. Based on client O/S resources then available when, during the boot process, the client requests a local hard disk access to a particular sector, the procedure will re-direct that request, to the network file server, through a network driver kernel in the client O/S rather than through a client interrupt handler. Each such request is processed, to provide physical sector read or write access, through my inventive random access trivial file transfer protocol (RATFTP) server executing in the network server. Advantageously, the source of the sectors remains transparent to the client O/S, while it is being booted from a network connection, in lieu of a local hard disk drive. Hence, client hard disk emulation occurs seamlessly and continuously throughout the entire boot process even though, during this process, the client processing mode changes from real to protected and the client O/S resets and gains control of a client network adapter.

39 Claims, 14 Drawing Sheets

```
# Blank lines and lines beginning with '#' are ignored.

# Each entry in the file contains a name for the entry and a series of
# fields, seperated by a colon.  Fields are defined by a two character
# "tag", supported tags are:

#       ha - hardware address
#       ip - host IP address IP address
#       hd - home directory
#       bf - bootfile
#       bs - boot server IP address
#       cs - cookie server IP address
#       ds - domain name server IP address
#       gw - gateway IP address
#       hn - return host name
#       dn - return host domain name
#       im - impress server IP address
#       lg - log server IP address
#       lp - LPR server IP address
#       sm - subnet mask
#       tc - template host (points to similar host entry)
#       to - time offset (seconds)
#       ts - time servers

# Fields within entries may appear in any order. Spaces and tabs in lines
# are ignored. An entry can span more than one line in the file by ending
# continuing lines with a backslash.

#Default template used by all hosts.
defaultation:hn:sm=255.255.0.0:vm=rfc1048:to=3600:

# a simple host entry
#John:tc=default:ha=00C0930067D2:ip=132.147.001.1:bf=john.img:
# a entry that uses more than one line
#Paul:   tc=default:\
#        ha=00A024823421:\
#        ip=132.147.180.4:\
#        bf=paul.img:
#Fred:tc=default:ha=0000F4B048CA:ip=132.147.180.7:bf=win95.img:
#Steve:tc=default:ha=00001B49D9D7:ip=132.147.180.10:bf=win95.img:
#Conrad:tc=default:ha=0207010422A7:ip=132.147.180.5:bf=win95.img:

LanHD_1:tc=default:ha=00A024B82705:ip=132.147.001.5:bf=lanhd.img:
LanHD_2:tc=default:ha=00A024BAF9A5:ip=132.147.001.6:\LANHD\:bf=lanhd.img:
LanHD_3:tc=default:ha=00608CF15EA3:ip=132.147.001.7:\LANHD\:bf=lanhd.img:
```

FIG. 5A

BOOTPTAB FILE

500

520

510

```
[00A024Baf9a5] ; 3c90x

#1:ip=132.147.001.001;hd=c:\lanhd\disk150;

[00A024B82705] ; 3c5x9

#1:ip=132.147.170.001;hd=c:\lanhd\disk20;db=A;

[00608CF15EA3] ; 3c5x9

#1:ip=132.147.190.005;hd=e:\lanhd\disk150
```

LANHD.INI FILE

550

REAL MODE PROCEDURE

FIG. 13 RATFTP COMMANDS

TECHNIQUE FOR RELIABLE NETWORK BOOTING OF AN OPERATING SYSTEM TO A CLIENT COMPUTER

BACKGROUND OF THE DISCLOSURE

1. Field of the Invention

The invention relates to a technique, specifically apparatus and accompanying methods, for use in a client-server environment for booting an operating system (O/S) on a client computer through a networked connection to a server. This technique is particularly, though not exclusively, suited for use in booting 32-bit personal computer (PC) operating systems and can be advantageously used to simplify system administration and significantly reduce administrative costs in, e.g., large enterprise environments.

2. Description of the Prior Art

Over the past decade, personal computer (PC) usage has increased substantially to the point where currently PCs (including workstations) have diffused into many aspects of a business organization. Coincident with this phenomena, a desire has increasingly arisen among computer users in a common organization to readily share computer files. This desire, particularly when fueled by historically decreasing costs of network equipment, has led to an expanding number of network installations throughout the business community to facilitate file sharing and electronic communication not only among users in a common organization, but also with users at other organizations and locations. Moreover, as these costs of increasingly sophisticated PCs and network equipment continue to fall, networked computer usage is penetrating increasingly smaller organizations as the expected benefits to those organizations, such as expanded productivity, outweigh the costs associated therewith.

If current cost and technology trends continue, PC usage should ideally proliferate throughout businesses to a point of becoming rather ubiquitous and inter-connected, i.e., at least ideally and at some time in the future where most people will possess their own PC and where such PCs will become increasingly inter-networked with each other.

However, in reality, a significant impediment to networking has been and continues to be cost—not just the initial and replacement cost of hardware, i.e. each computer and associated network equipment, and the time and effort required to successfully connect them together, but also the cost of administering, on a post-installation basis, each and every networked computer. This latter cost, which often vastly exceeds the cost of the former, includes the cost of servicing, including updating, the software stored on each and every networked computer. In a typical enterprise environment having thousands or tens of thousands of networked client PCs—which is very common today, it is very expensive for a network administrator, or more generally speaking in a large enterprise a member of an information technology (IT) department, to physically visit each user and service his(her) client computer as required. Inasmuch as a predominant component of total post-installation administrative costs is for client software, software and computer manufacturers have recently embarked on various product initiatives aimed at reducing the cost of maintaining installed client software. For the most part, these efforts, as they relate to software manufacturers, are expected to involve providing a version of their software products that can be installed and centrally maintained on a network server and then identically downloaded as a single image, via the network, to each and every client PC on which that software is to be installed. This concept, as currently envisioned, could be extended past just a single application to encompass all or a set of applications that would be common to most, if not all, of the PCs on a network. By doing so, the intent would be to eliminate a need to separately administer the software stored on every single workstation on the network in favor of doing so just once—on a shared installation image on a server. Moreover, as part of these initiatives, automated techniques are being developed to permit such administration to occur remotely through the network thereby eliminating any need for an individual to physically visit each such PC and personally service its software.

To achieve effective centralized administration of network clients, ideally a server should store a complete image of the software, including the operating system (O/S), utilized by a client computer. As each client computer is powered-on by its user, that client would establish a connection with the server and boot its operating system from the server. In particular, an operating system image would be stored on the server and would be transferred, via the network, to the client onto which that operating system would be set-up and run. Application software could then be transferred from the server, as needed, to the client and then run on the client. Proceeding in this fashion could eliminate the need for any hard disk storage on each client, thereby facilitating use of low-cost "diskless" computers. Alternatively, application software could remain on the server and be executed therefrom.

Unfortunately, serious impediments exist that, in practice, effectively limit the extent to which a client computer can be centrally administered and, specifically, a client O/S booted from a network server.

Currently, a common and widely used 32-bit PC operating system, specifically Windows 95 O/S available from Microsoft Corporation of Redmond, Washington (which also owns the registered trademark "Windows 95"), provides rather limited and problematic server-based set-up abilities. Ideally, for server-based set-up of a client PC, the client O/S should be bootable from either a system floppy diskette or a ROM, situated within the PC, and then download all the other system files from a network file server. The ROM would store suitable code that emulates the floppy disk.

At present, in practice, during the course of configuring a particular client computer for server-based setup of the Windows 95 O/S, this O/S would create two directories on the client computer for subsequent transfer to a server: a machine directory which stores configuration information for that specific client, and a share directory which contains shared O/S files. During the boot process, both directories are used to control the remainder of the set-up process and load appropriate O/S files onto the client. It was empirically found that, from time to time—though not all the time, while creating the directories on the server, the client computer would simply halt, i.e. "freeze". In other instances where the directories were successfully created, users found that sometimes during the network boot process, the client computer would also halt— again from time to time, though here too not always. Moreover, apart from these problems, the Windows 95 operating system, as it currently stands, apparently does not support network booting through a 32-bit local area network (LAN) adapter. While 16-bit ISA (Industry Standard Architecture) network (e.g., LAN) adapters were prevalent at the time the Windows 95 O/S was introduced, currently 32-bit adapters, particularly PCI (Peripheral Component Interconnect) type adapters predominate a network adapter market. Lastly, difficulties arose in changing a server-based installation of a Windows 95 client, thereby frustrating centralized remote administration of the application software to be downloaded to that client.

Given these difficulties, the art has apparently veered away from the concept of providing server-based setup of a 32-bit PC O/S in favor of using different approaches for centralized client administration. One such approach relies on using an inexpensive client PC, i.e., a so-called "thin client", to essentially transmit user keystrokes to a server at which they are processed and at which applications are run. The results would then be returned, via the network to the client PC, and displayed to the user through an appropriate graphical user interface executing at the client PC. While this approach eliminates a need to store and execute application software on a client PC, it does so at the expense of shifting application processing to a network server. In a large networked environment, the added processing load placed on the server could render this approach impractical. While the use of inexpensive PCs, such as "thin clients" and "diskless" PCs certainly have merit to reduce costs and centralize administration in large networked enterprise environments, such PCs, as presently envisioned, still require an operating system, which, for effective centralized administration, should be booted from a network.

Therefore, a need exists in the art for a technique, specifically apparatus and accompanying methods, for use in a client-server environment for reliably booting an operating system, such as a 32-bit O/S, on a client PC from a network server. Moreover, such a technique, should be fully operative with all currently available LAN adapters, whether, e.g., 16- or 32-bit and permit changes to be easily made to any server-based installation of client software. Through use of such a technique, the processing load on the network server (s) can be advantageously reduced by utilizing local client RAM memory and CPU resources, rather than server resources, for client application and client O/S processing. Consequently, by utilizing these client resources, server complexity and cost, such as those occasioned by large amounts of RAM and multiple CPUs that might otherwise be required, could be sharply reduced. By virtue of meeting these needs and being capable of network booting an O/S, such as the Windows 95 O/S, on substantially any client PC, including thin-clients and diskless PCs, such a technique should find widespread use in implementing effective centralized client administration in, e.g., large networked enterprises and in providing significant administrative cost savings.

SUMMARY OF THE INVENTION

The present invention overcomes the deficiencies in the art and satisfies these needs by providing, through a network server, seamless and continuous client hard disk emulation, at a physical sectorized level, throughout the entire boot process even though, during this process, various O/S files are downloaded and O/S processes are activated which collectively change a client processing mode from real to protected and which reset and gain control of a network adapter in the client.

In accordance with my inventive teachings, a network server stores an image of a client hard disk, including the client O/S and desired applications. Rather than directing each request that arises during booting of the client O/S, for a specific sector of a stored file to a local hard disk on the client, an inventive transport driver, which is downloaded and installed on the client as part of the client O/S, redirects that request to the network server to retrieve and download that sector, from the client hard disk image, to the client. As a result, the source of the sectors remains transparent to the O/S, i.e., the client O/S is unaware that it is being booted remotely from a network server in lieu of a local hard disk drive. Each such request is processed through my inventive random access trivial file transfer protocol (RATFTP) server executing in the network server to provide read/write sectorized access to the client image file.

Specifically, whenever a user energizes a client computer (such as, e.g., a PC), this PC establishes a network connection to the network server and issues a boot request to that server. In response to this request, the network server downloads sufficient files from the stored client O/S image to the client PC to permit the client to boot the O/S and continue loading the required O/S files from that image.

During booting, the client PC initially operates in a real mode and then, based on the client O/S processes then initiating, transitions to a protected mode.

While the boot process is occurring but prior to the availability of any client O/S-based network support, client hard disk emulation occurs through appropriate calls made to an interrupt (Interrupt 13 or simply "Int 13") handler. Through such calls, appropriate sectors in the client image file are initially downloaded, via a real-mode network adapter (NIC) driver and the Int 13 Handler to remotely install various components of the O/S into client PC. The actual client hard disk emulation process is provided through a real mode procedure that executes as part of Int 13 Handler. In essence, the real mode procedure determines, based on values of status flags, whether the client O/S is then capable of handling a network request for sector access of the client image file. If the client O/S has not then progressed to that point in its boot process, the real mode procedure processes that request, in real mode, through the Int 13 Handler.

As a client O/S kernel is installed and initialized during the boot process, the kernel installs and activates various device drivers, including the inventive LANHDVSD.VXD procedure. This procedure is compliant with both the Int 13 Handler and with the O/S, specifically, in the case of Windows 95 O/S, a network driver (NDIS—network driver interface specification) kernel therein and the O/S input/output subsystem (IOS). The inventive procedure, which executes as a protected mode driver, contains two asynchronous procedures. These asynchronous procedures, by setting and testing appropriate flags used as processing state semaphores, collectively control the transition of hard disk requests to the networked client image from the Int 13 Handler to the client O/S depending upon, as the client O/S is then booting, the O/S resources that are then available. During early phases of the boot process, insufficient O/S components have been loaded and activated to provide client O/S supported network access. Consequently, client hard disk access requests are handled through the Int 13 Handler. Whenever sufficient O/S resources become available to permit network access through the client O/S, the asynchronous procedures permit these requests to be serviced by the NDIS and IOS components of the client O/S, so as to provide O/S supported network access, rather than by the Int 13 Handler. Hence, these asynchronous procedures collectively assure, in conjunction with Int 13 Handler, seamless and continuous client hard disk emulation during the real-protected transitory state.

Inasmuch as client hard disk emulation occurs at a physical, i.e., sector, level, rather than at a higher level, my present invention, as one of its features, is independent of and properly operates with substantially any particular client file system, whether it is, e.g., FAT, FAT32, HPFS or NTFS.

BRIEF DESCRIPTION OF THE DRAWINGS

The teachings of the present invention can be readily understood by considering the following detailed description in conjunction with the accompanying drawings, in which:

FIGS. 4A and 4B collectively depict, at a high-level, sequential message flow involving client PC 10 and various illustrative network servers 50 and 410 for network booting the client PC, in accordance with my present invention, and various states of the client PC along with simultaneously occurring operational status while being so booted;

FIG. 13 depicts commands 1300 executed by RATFTP server 1200; and

To facilitate understanding, identical reference numerals have been used, where possible, to designate identical elements that are common to various figures.

DETAILED DESCRIPTION

After considering the following description, those skilled in the art will clearly realize that the teachings of the present invention can be readily utilized in conjunction with many different computer operating systems to provide network booting of any such O/S to a client computer. Nevertheless, to simplify the ensuing description, I will discuss my invention in the illustrative context of use with remotely installing and booting the Windows 95 O/S on a client computer in a client-server environment, where the client computer is illustratively a personal computer (PC). For ease of reference, this PC will be referred to hereinafter as a "client PC".

Figure 1:
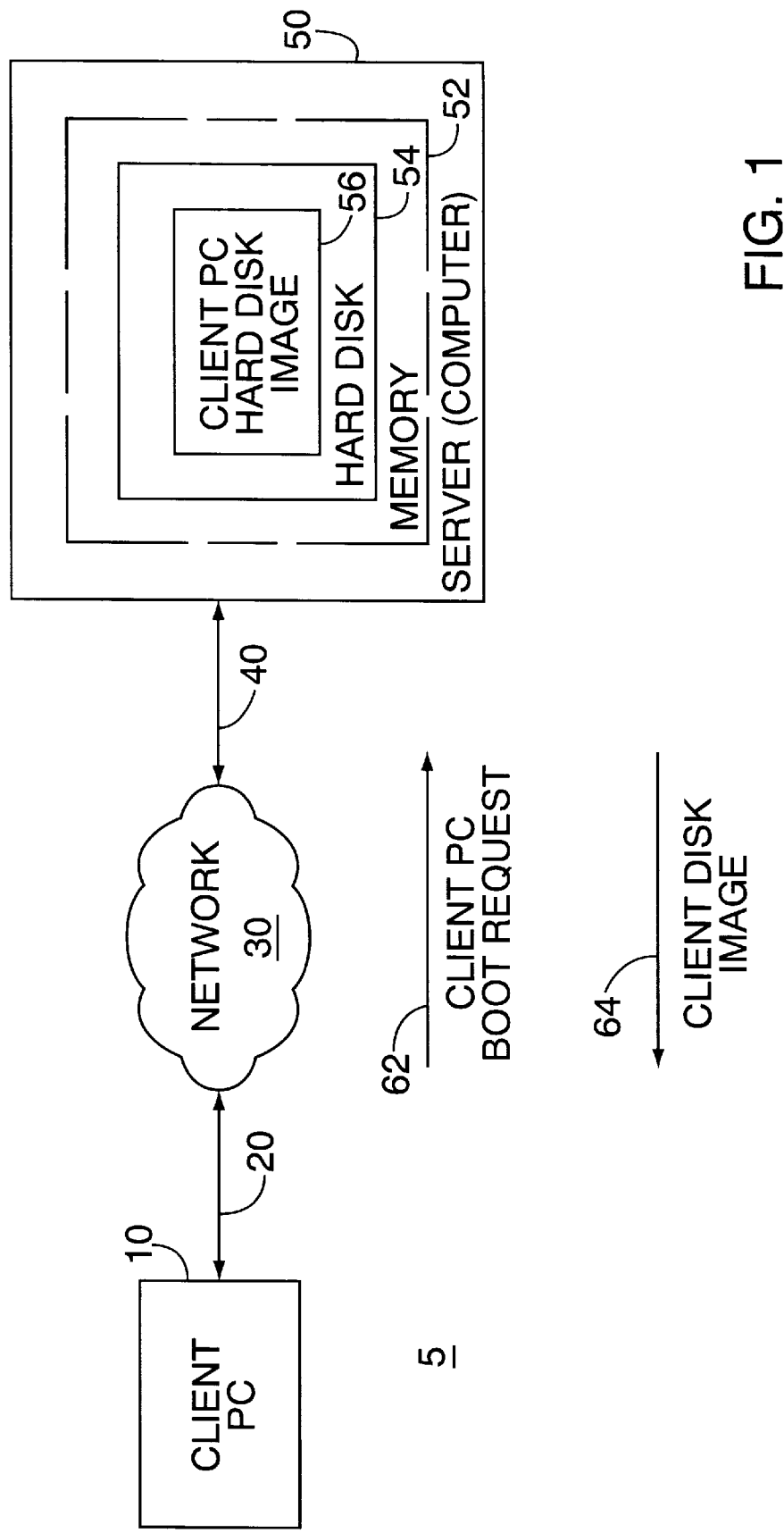
FIG. 1 depicts a high-level simplified block diagram of client-server environment 5 in which illustratively client personal computer (PC) 10 is to be booted through server 50 in accordance with my inventive teachings.

In this context, FIG. 1 depicts a high-level simplified block diagram of client-server environment 5 in which client PC 10 is to be booted through server 50. As shown, client PC 10 is connected, via links 20 and 40, and network 30, to network server 50. Inasmuch as the particular implementation and architecture of network 30 are both irrelevant, the ensuing discussion will omit all such details. Through the present invention, a complete image of the Windows 95 O/S that is to execute on client PC 10 is stored as image 56 on hard disk 54 within memory 52 of server 50.

In operation, whenever a user energizes (powers-up) client PC 10, this PC then establishes a network connection to the server and issues a boot request, as symbolized by line 62, to the server. In response to this request, as symbolized by line 64, the server downloads sufficient files from the stored client O/S image to the client PC to permit the client to boot the O/S and continue loading the required O/S files from the server.

In accordance with the inventive teachings, to facilitate reliable network booting of, e.g., a 32-bit client O/S, such as Windows 95 O/S, the server implements sector-by-sector hard disk emulation of a local hard disk on the client PC. The server stores an image of a client hard disk, including the O/S and desired applications. Rather than directing each request that arises during booting of the client O/S, for a specific sector of a stored file, to a local hard disk on the client, my inventive transport driver, which is downloaded and installed on the client as part of the client O/S, redirects that request to the server to retrieve and download that sector, from the client hard disk image, to the client PC. As a result, the source of the sectors remains transparent to the O/S, i.e., the client O/S is unaware that it is being booted from a network connection in lieu of a local hard disk drive. To provide reliable network booting, the inventive technique advantageously provides seamless and continuous client hard disk emulation throughout the entire boot process even though, during this process, various O/S files are downloaded and O/S processes, such as a Windows 95 network driver, are activated which collectively change the processing mode of the client PC from real to protected and which reset and gain control of a network (e.g., LAN) adapter in the client PC.

Once a processing mode is changed by the Windows 95 O/S to protected from real, that O/S would isolate a local hard disk from being directly read- or write-accessed outside of the O/S. Conventionally speaking and in the absence of using the inventive teachings, this mode change would frustrate continued server-based client hard disk emulation. Also, once the Windows 95 O/S gains control, i.e., "ownership", of the network adapter, no process external to the O/S could then gain direct access to that adapter. Consequently, again in the absence of using the inventive teachings, this too would frustrate continued server-based client hard disk emulation. As will be seen, my present invention advantageously overcomes both of these conventional limitations.

Figure 2A:
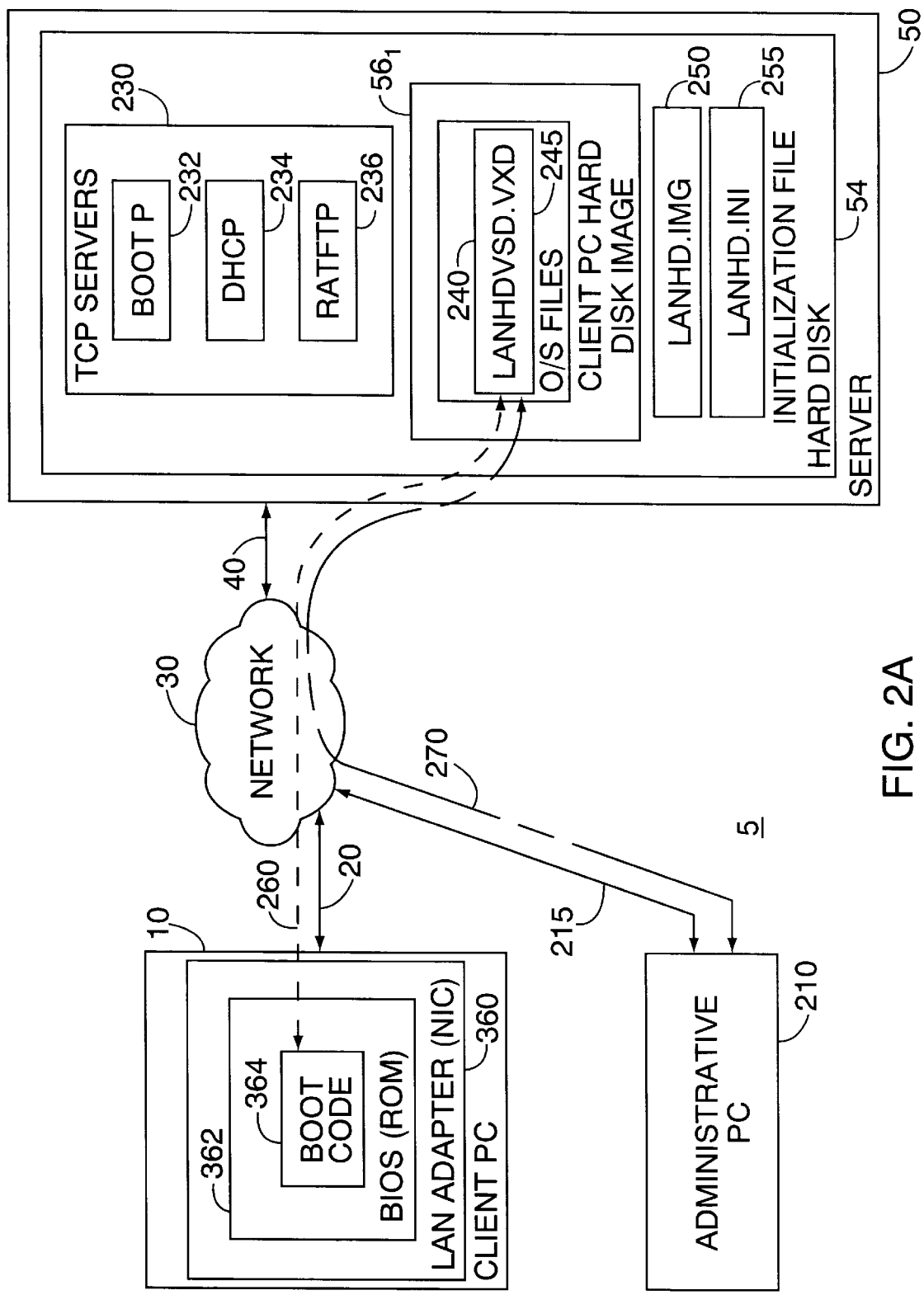
FIG. 2A depicts a block diagram of environment 5 showing, in additional detail, various elements of my present invention.

FIG. 2A depicts a block diagram of environment 5 showing, in additional detail, various elements of my present invention.

As shown, client PC 10 contains LAN adapter (also commonly referred to as a network interface card—NIC) 360. Each such NIC carries a unique physical hardware address, referred to as a media access control (MAC) address, through which that card can be uniquely addressed on a network. An illustrative MAC address is "00A024Baf9a5". Each NIC also contains internal read only memory 362 that stores boot code 364, which contains a BootP client process. Though this code is usually stored within the NIC, as shown here, this code could alternatively be implemented within a PC ROM BIOS (basic input output system) located on a motherboard of the client PC. With the boot code stored in the NIC, as shown, and read into memory of the PC on power-up and executed, the client PC establishes a network connection, through network 30 and connections 20 and 40, with remote server 50 for remotely booting of the client PC. Server 50 contains, to the extent relevant to the present invention, TCP (transmission control protocol) servers 230, specifically: either BootP server 232 or DHCP (dynamic host configuration protocol) server 234, and my inventive random access trivial file transfer protocol (RATFTP) server 236. The BootP and DHCP servers are conventional in nature and, as such, will not be discussed in any detail. On the other hand, the RATFTP server, while based on and extends capabilities of a conventional trivial file transfer protocol (TFTP) server, accesses individual desired sector(s) (rather than just a complete file as does a conventional TFTP server), on hard disk 54 situated within server 50—thus facilitating client hard disk emulation. Such sectors are specified by a boot loader and downloaded into client PC during the network boot process.

Figure 4:
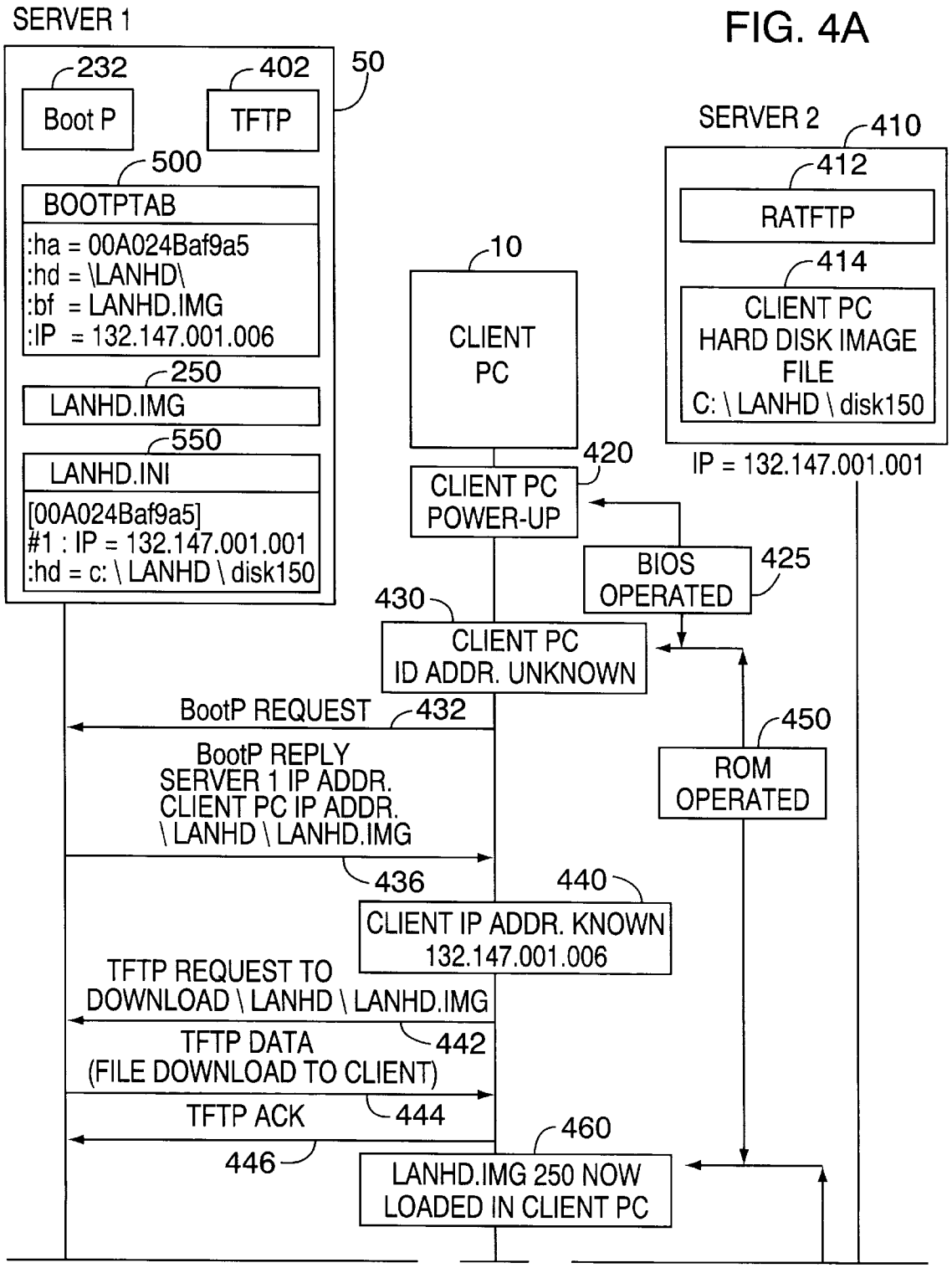
FIG. 4 depicts the correct alignment of the drawing sheets for FIGS. 4A and 4B.
Figure 5:
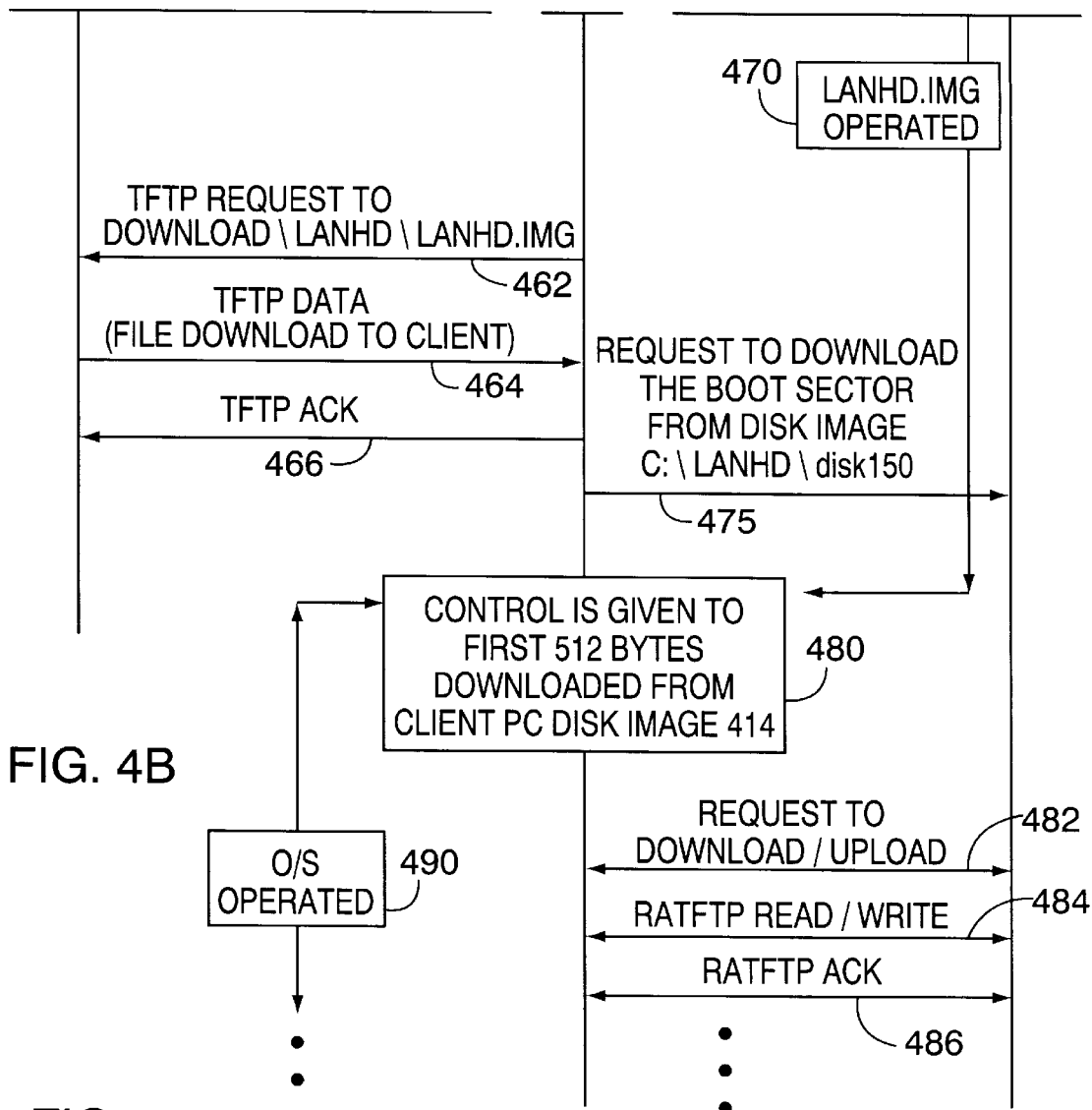
FIG. 5A depicts an illustrative listing for BOOTPTAB file 500 that resides within server 50 and is used during network booting of client PC 10.
FIG. 5B depicts an illustrative listing for LANHD.INI file 550 that resides within server 50 and is also used during network booting of client PC 10.

In addition to TCP servers 230, server 50 also stores, on hard disk 54, a directory containing client PC hard disk image $56^1$. This image contains all O/S files 240 and accompanying user application files that are to execute on client PC 10. The O/S files include LANHDVSD.VXD file 245. This file, which will be discussed in considerable detail below, when executed during start-up of the client PC, essentially permits the client hard disk to be remotely emulated through RATFTP server 236 and so as to remotely boot the client O/S from client PC hard disk image $56_1$ and advantageously in a manner that seamlessly permits the emulation (and remote booting) to continue: (a) during and after the processing mode of the client PC switches from real to protected; and (b) after the O/S, as it boots, takes over ownership of NIC 360. In addition to the client image file, the server also stores, on hard disk 54, LANHD.IMG file 250 and initialization file 255, i.e., file LANHD.INI. The LANHD.IMG file contains code that properly interprets Interrupt 13 calls in the client PC for hard disk accesses during an initial boot process, i.e., prior to availability of network support through client O/S. The LANHD.INI file stores initialization information required for remote booting. This information specifies a corresponding network server, in terms of its IP (Internet protocol) address on the network, which stores a client hard disk image file for each of a group of client PCs (if not all such remotely bootable PCs) that can be remotely booted from the network and a directory on that server in which the image file is located. In particular, as shown in FIG. 5B and discussed below, the LANHD.INI file contains a series of entries, with each entry specifying a different MAC address, a corresponding server IP address therefor and a directory name. Once remote booting commences, server 50 downloads, through client hard disk emulation on a sector-by-sector basis and as symbolized by dashed line 260, image file $56_1$ to client PC 10 in order to remotely boot that client PC. The sequential operations that effectuate remote booting will be discussed below first in conjunction with FIG. 4.

To readily permit centralized client software administration, environment 5 also includes administrative PC 210 (which is substantially, if not totally, identical in architecture to client PC 10), which is connected, via link 215, to network 30. Once an administrator stationed at the administrative PC establishes a networked connection to server 50 and has appropriate security and file access permissions set on the server, that administrator can access, as symbolized by long-short dashed line 270, on a read and write basis, the client PC hard disk image files, such as, e.g., file $56_1$, stored on the server. As a result, the administrator has the ability, as desired and from one location, to open, copy, update and change the contents of any client PC image file stored on server 50 remotely from its associated client PC and without a need for that client PC to be energized. By providing such centralized client software administration for all networked clients (of which only client PC 10 is shown in FIG. 2A for simplicity), use of the present invention should markedly reduce administrative cost, particularly in large enterprise environments.

A client PC image file need not be restricted to a single file that contains a complete hard disk image and is accessible by just its associated client PC. In that regard, FIG. 2A depicts an alternate embodiment of client hard disk image files stored on server 50. Here, client disk images $56_2$ contain client specific image files 280, in separate directories, and a directory containing single shared client O/S files 290. Here, each client image directory stores files unique to a corresponding client PC that is to be remotely booted, e.g., directories $280_1, \ldots, 280_n$ store files for client PCs 1, ..., n, respectively, which are downloaded during the boot process or accessed thereafter. Each such directory thus has a 1:1 correspondence, as symbolized by lines 285, with its corresponding client PC. In contrast, shared directory 290 contains files, such as LANHDVSD.VXD file 245, that are common to all remotely bootable networked PCs. Hence, directory 290 has a 1:n correspondence, as symbolized by lines 295, between it and all n remotely bootable client PCs.

Figure 2B:
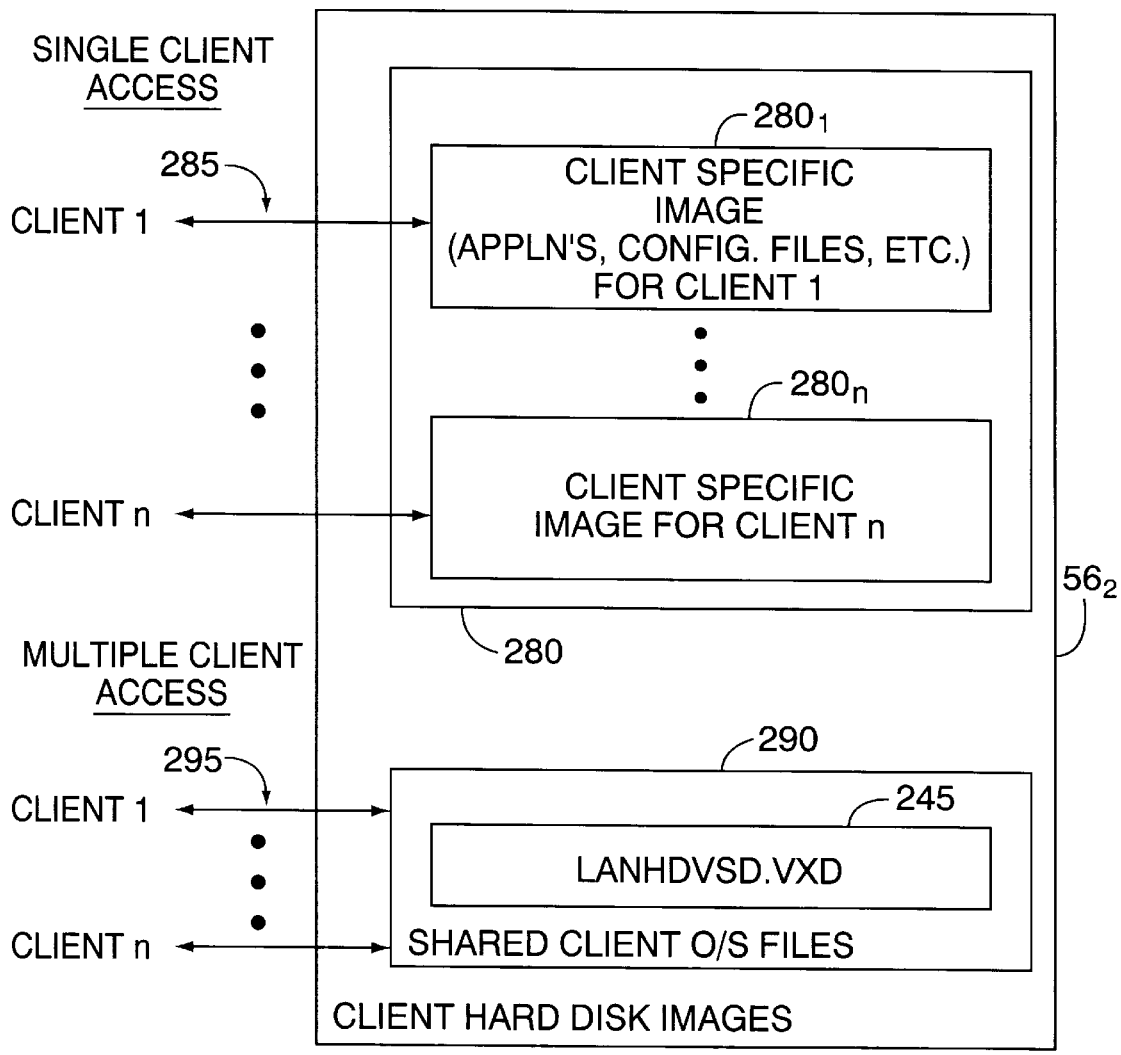
FIG. 2B depicts an alternate embodiment of client hard disk image files as could be stored on hard disk 54 within server 50 shown FIG. 2A.

Between these two extremes shown in FIGS. 2A and 2B, client images, specifically the underlying files, could be stored across other server-based file structures depending upon, e.g., which specific client PCs and the number of such PCs that are to share files, and the specific files that either are to be shared or not shared and by which PCs.

Figure 3:
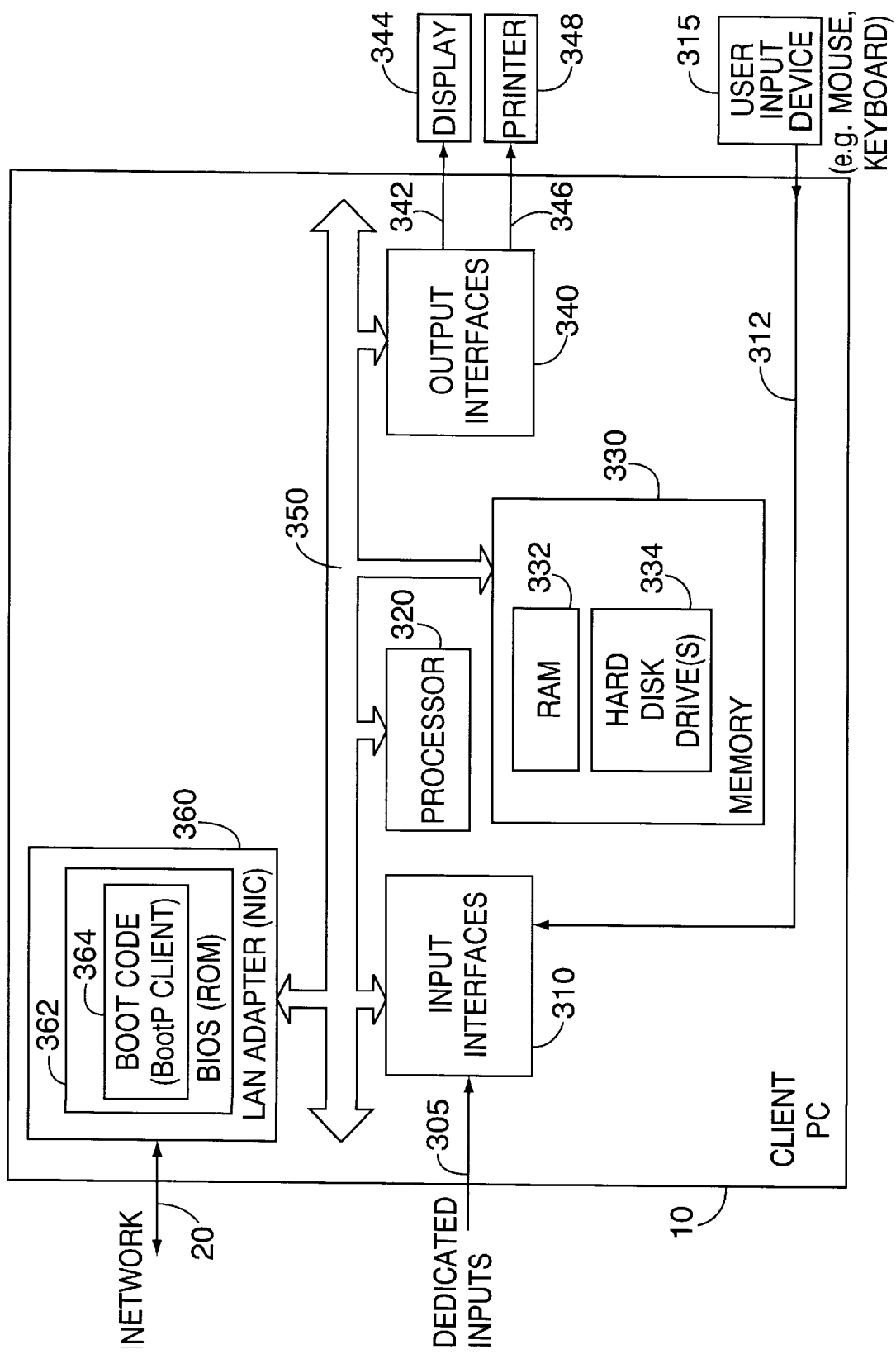
FIG. 3 depicts a high-level block diagram of an illustrative client computer, such as client PC 10, within environment 5 shown in FIGS. 1 and 2A.

FIG. 3 depicts a high-level block diagram of client PC 10.

As shown, client PC 10 comprises input interfaces (I/F) 310, processor 320, NIC 360, memory 330 and output interfaces 340, all conventionally interconnected by bus 350. Memory 330, which generally includes different modalities, includes illustratively random access memory (RAM) 332 for temporary data and instruction store, diskette drive(s) (not specifically shown) for exchanging information, as per user command, with floppy diskettes, and non-volatile mass store 335 that is implemented through hard disk drive(s)

334, typically magnetic in nature. Should client PC 10 be implemented by "diskless" computer, then all disk drives, including both floppy diskette drive(s) and hard disk drive(s) 334, would be omitted. Regardless of whether client PC 10 contained a hard disk drive or not, the client O/S, during its boot process, would be downloaded into RAM 332 and executed therefrom. As shown above in FIG. 2A, NIC 360 contains internal read-only memory 362, that stores network boot code 364. This code, as will be discussed shortly below, once downloaded into RAM 332 on power-up permits the NIC to establish a network connection to a remote server.

Incoming information can arise from two illustrative external sources: network supplied information, such as, in the context of network booting, sectorized information from a client hard disk emulation process executing in a network server, through network connection 20 to NIC 360, or other information from a dedicated input source—should it be connected, via path 305, to input interfaces 310. Since such a dedicated input source is not relevant here, it will not be discussed in any further detail. Suffice it to say that input interfaces 310 contain appropriate circuitry to provide necessary and corresponding electrical connections required to physically connect and interface each differing dedicated input source to client PC 10.

Input interfaces 310 also electrically connect and interface user input device 315, such as a keyboard and mouse, to client PC 10. Display 344, such as a conventional color monitor, and printer 348, such as a conventional laser printer, are connected, via leads 342 and 346, respectively, to output interfaces 340. The output interfaces provide requisite circuitry to electrically connect and interface the display and printer to the client PC.

Furthermore, since the specific hardware components of client PC 10 as well as all aspects of the software stored within memory 330, apart from the modules that implement the present invention, are conventional and well-known, they will not be discussed in any further detail. Generally speaking, the network server, such as server 50 (shown in FIGS. 1 and 2) has an architecture that, at a high-level, is quite similar to that of client PC 10.

I will now discuss, at a high level, the sequential message flow that occurs, in accordance with my present invention, between client PC 10 and the network to remotely boot this client. FIGS. 4A and 4B collectively depict this message flow, involving client PC 10 and illustrative network servers 50 and 410; the correct alignment of these figures is shown in FIG. 4. FIGS. 4A and 4B also depict the operational states and status of the client PC during its remote booting. Since this discussion will also refer to BOOTPTAB file 500 and LANHD.INI file 550 which are respectively and illustratively shown in FIGS. 5A and 5B, then, for ease of understanding, the reader should simultaneously refer to FIGS. 4A, 4B, 5A and 5B throughout the following discussion.

Once a user has powered-up client PC 10, as symbolized by block 420, the stored ROM BIOS in the client PC is loaded into RAM 332 (see FIG. 3) of the client PC from which that code is then executed by the PC. This operational mode is denoted by block 425 shown in FIGS. 4A and 4B. At this point, as symbolized by block 430, the client PC is not aware of its IP address. The client PC then reads the boot code from a ROM situated on the NIC (or alternatively on the motherboard of the client PC itself) into RAM 332 and then executes that code—this operational mode denoted by block 450. In response to this code, the client PC will broadcast, as symbolized by line 432, a BootP (or DHCP) request packet over the network to elicit a response from a BootP (or DHCP) server. Illustratively, server 50 contains BootP server 232. This packet contains the hardware address of the NIC. For exemplary purposes, I will assume that address is "00A024Baf9a5". BootP server 232, which is a conventional TCP server, permits a network device, such as the NIC, to obtain its own IP address (i.e., here an IP address assigned to client PC 10), the name of a boot file to download, an IP address of a network server (here server 50) on which that boot file is located, and (where appropriate) an IP address of a default router. BootP server 232 does not download the boot file itself; that occurs, as will be shortly seen by TFTP server 402 executing within server 50. The IP address of the device can also be obtained through a DHCP request packet. DHCP is a newer protocol than BootP, and builds on and replaces BootP. Inasmuch as the BootP and DHCP protocols are conventional and well-known, I will not discuss them in any further detail. In that regard, for further information, the reader is referred to Chapter 19, "Booting Internet Hosts with BootP and TFTP" on pages 343–359 of P. Miller, *TCP/IP Explained* (©1997, Digital Press)—hereinafter the "Miller" text; and Chapter 16, "BOOTP: Bootstrap Protocol" on pages 215–222 of W. R. Stevens, *TCP/IP Illustrated, Volume 1—The Protocols* (©1994, Addison-Wesley Inc.). Both of these chapters are incorporated by reference herein. Since, for purposes of the present invention, either the BootP or DHCP protocols can be used with identical results, then, to simplify the ensuing discussion, I will omit any further reference to use of the DHCP protocol. The BootP server utilizes BOOTPTAB file 500. This file, illustratively shown in FIG. 5A, contains an entry for each of a number of remotely bootable devices that can connect to the network. Each such entry, such as entry 520 within entries 510, specifies for a single associated device: a hardware address (ha), i.e., a MAC, for that device; an associated boot file (bf) for that device; a home directory (hd) on that server which contains the boot file; and an IP address (ip) to assign to that device. For ease of access, the boot file and home directory reside on the same server as the BOOTPTAB file, here server 50. While the network may contain multiple BootP servers (of which, for simplicity, only one of which is shown in FIGS. 4A and 4B), each remotely bootable device, such as a given NIC, has only one unique corresponding entry in only one BOOTPTAB file. In this manner, a broadcast BootP request appearing on the network from a given device will engender only one response from a single server that has an entry, in its BOOTPTAB file, that contains a MAC matching that contained in the request.

In response to the BootP request packet, server 50 (also denoted as server 1), specifically BootP server 232 therein, will issue, as symbolized by line 436, a BootP reply packet onto the network. In particular, the BootP server will search through BOOTPTAB file 500 to locate an entry containing a MAC that matches that in the BootP request packet. If a match is found, as is the case for server 50, then BootP server 232 will issue the BootP reply packet. This reply packet will contain, from the parameters specified in the entry located in the BOOTPTAB file (only one such entry is illustratively shown in FIGS. 4A and 4B), an IP address assigned by the BootP server to client PC 10 (here 132.147.001.006), an IP address of server 50 (this IP address not being specifically shown in the entry) at which the boot file can be accessed, and a complete path on the server to the boot file (here \LANHD\LANHD.IMG). The boot file, here illustratively boot file 250 named LANHD.IMG, contains real-mode client hard disk emulation code as well as a name of an initialization file to be accessed. The initialization file, specifically LANHD.INI, specifies a full path, including a file name, of a client image file and a network server on which that file is stored. For illustrative purposes, the client image for client PC 10 is shown as being stored on network server 410 (also denoted as server 2) which is different from that (server 50) storing the boot file. In other situations, these two network servers could be the same.

In any event, after the client PC appropriately processes the BootP reply, the client PC will then know, as symbolized by block 440, its IP address. Next, as symbolized by line 442, the PC will issue, through the NIC, a TFTP request (typically a TFTP read command) to server 50, specifically TFTP server 402 thereon, to download the boot file identified in the BootP reply packet. If the TFTP server can locate and open this file based on the information provided in the TFTP request, then, as symbolized by line 444, TFTP server 402 will download the boot file to client PC 10. Once the boot file has been completely downloaded into RAM 332 (see FIG. 3) on client PC 10, this PC will acknowledge a successful download by issuing, as symbolized by line 446 shown in FIGS. 4A and 4B, a TFTP acknowledgement (ACK) packet, back to server 50. With the boot file (LANHD.IMG) residing, as symbolized by block 460, in the client PC and after the ACK packet is issued, the client PC will begin executing the boot file from RAM 332 to implement client hard disk emulation. At this point, client PC 10 begins operating, as symbolized by block 470, under control of the downloaded boot file (LANHD.IMG) and ceases operating under the ROM boot code previously downloaded from, e.g., the NIC.

The boot file, early in its execution, will cause the client PC to issue -a-TFPT request, as symbolized by line 462, back to server 50 to download an initialization file, specifically LANHD.INI file 550. This initialization file, as shown in FIG. 5B, also contains a series of entries. Here, each such entry, of which entry 560 is typical, contains a MAC, an IP address of a server that stores a client image file for the device having that MAC and a complete path to the client image file (here file 414 on server 410) on that server. A LANHD.INI file entry also contains an illustrative term, such as "3c90x" or "3c5x9", which merely describes a name of the NIC associated with that entry and is ignored, as a comment field, during subsequent processing of this file by the client PC. A further parameter (db) in entry 560 defines a default boot option (illustratively set to A or C) which is not relevant here. Once the download, as symbolized by line 464, completes, client PC 10 will then generate and transmit, as symbolized by line 466, a TFTP ACK packet, over the network back to server 50. Furthermore, once this file has been downloaded, the client PC, under control of the boot file, LANHD.IMG, will process this file by first checking the contents of this file to determine whether an entry in the file contains a MAC that matches that of the NIC in the client PC. When an entry having a matching MAC is found, as illustratively occurs here, the boot file will then extract, from that entry, the full path to the client image file (here C:\LANHD\disk150) and the IP address (here 132.147.001.001) of a network server (here server 410) on which the client image file resides. Once client PC 10 obtains this information from the initialization file, the client PC, specifically executing the boot file (LANHD.IMG) which is then performing client hard disk emulation, issues, as symbolized by line 475, an RATFTP request to network server 410 to download a boot sector from client PC image file 414 residing thereon.

In response to the RATFTP request, RATFTP server 412 executing on network server 410 downloads the boot sector from the client PC image file to client PC 10 and specifically into RAM 332 (see FIG. 3) on that PC. Once this boot sector is completely downloaded into RAM, the client PC then, as symbolized by block 480, executes it. Under control of the boot sector, various remaining files of the 32-bit client PC O/S are downloaded in sequence and their execution started in order to initiate associated O/S processes and, by doing so, complete the start-up of the client O/S on PC 10. Such downloading occurs on a sector-by-sector basis through corresponding RATFTP read operations. In addition, the client O/S can write information, also on a sector-by-sector basis (through client hard disk emulation), into its client image file through RATFTP write operations. These RATFTP operations are symbolized by line 484 and are preceded by a request, as symbolized by line 482, to download/upload information between server 410 and client PC 10. Each such RATFTP operation is acknowledged, as symbolized by line 486, upon its completion, by the device that receives data, i.e., either the client PC or network server 410. From the point that the boot sector takes over control of the client PC, the PC is thereafter operated by the client O/S, as symbolized by block 490, rather than by the boot file LANHD.IMG.

Figure 6:
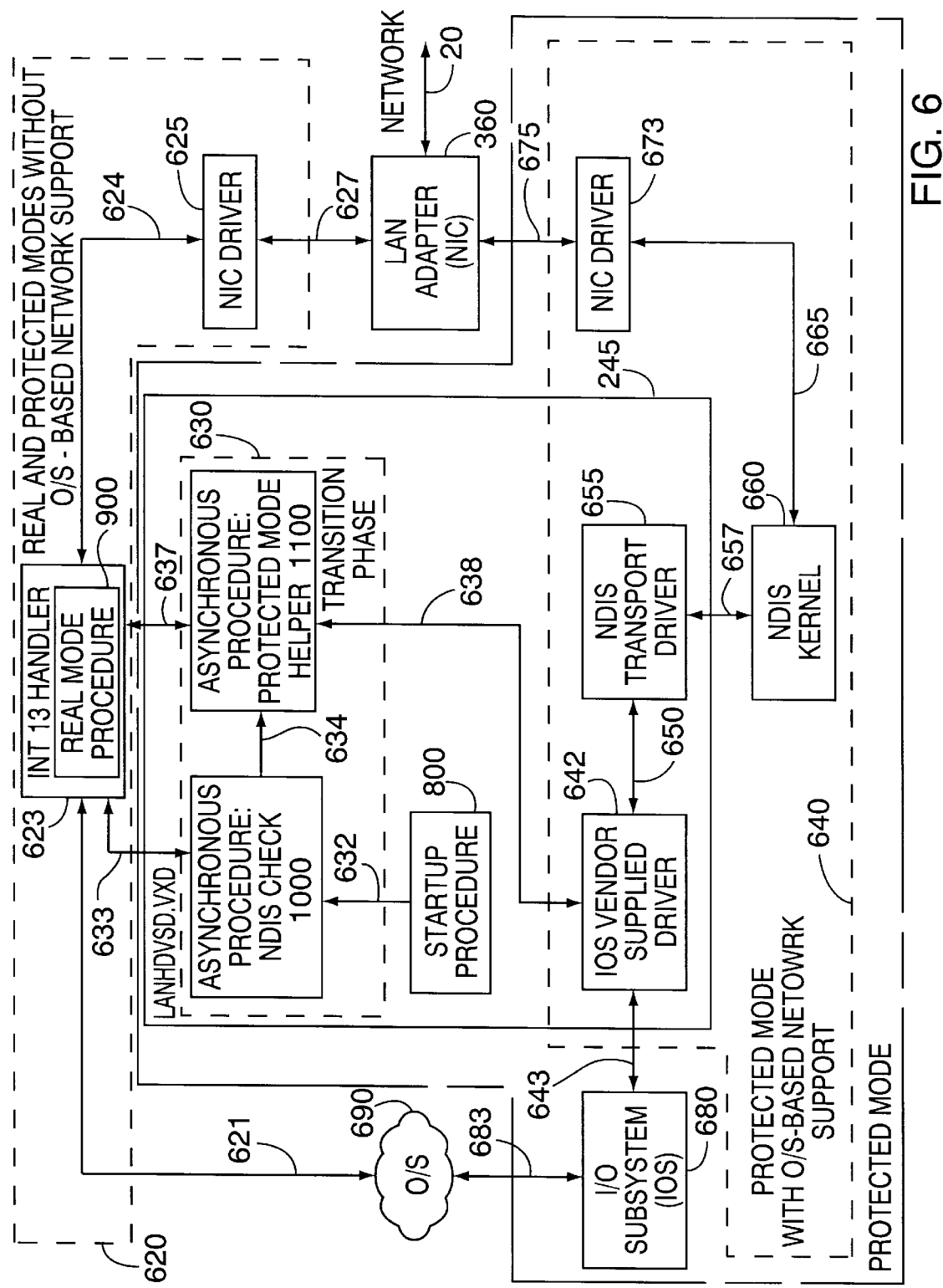
FIG. 6 depicts a high-level block diagram of various software processes, including LANHDVSD.VXD procedure 245, that, in accordance with the present invention, collectively network boot client PC 10.
Figure 7:
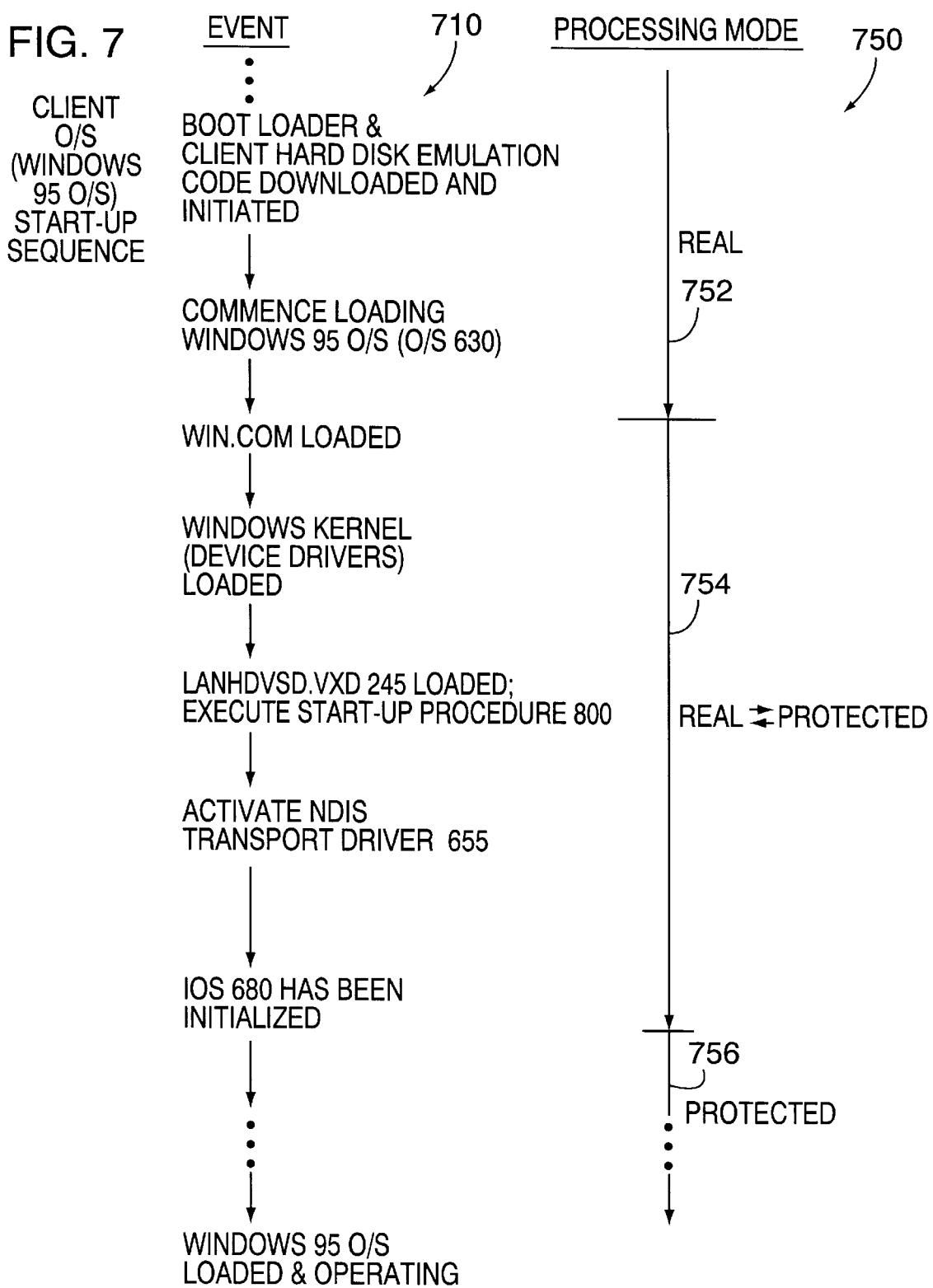
FIG. 7 depicts a start-up sequence of events, that occur in client PC 10 and in accordance with my present invention, to network boot a client operating system, and accompanying processing modes which occur during that sequence.

FIG. 6 depicts a high-level block diagram of various software processes, including LANHDVSD.VXD procedure 245, which executing in the client PC collectively network boot that PC. To fully appreciate the interaction of these procedures, the reader should also simultaneously refer throughout the following discussion to FIG. 7 which shows basic start-up sequence 710 that occurs within the client PC for implementing network booting and the associated processing modes 750 that simultaneously occur in that PC.

During network booting, the client PC initially operates in a real processing mode and then, based on the client O/S processes then initiating, transitions to a protected processing mode. LANHDVSD.VXD procedure 245 permits client PC hard disk emulation to seamlessly continue while the processing modes change during O/S booting as well as after the client O/S takes ownership of the NIC in the client PC.

During the boot process and prior to the availability of any client O/S-based network support, client hard disk emulation occurs, as discussed above in conjunction with LANHD.IMG operation shown in FIGS. 4A and 4B, through appropriate calls made to Interrupt 13 (Int 13) handler 623. Through such calls, appropriate sectors in the client image file are downloaded, via real-mode NIC driver 625 and Int 13 Handler 623 to remotely install various components of O/S 690 into client PC. The actual client hard disk emulation process is provided through Real Mode Procedure 900 that executes as part of Int 13 Handler 623. In essence, procedure 900 determines, based on values of status flags, whether the client O/S is then capable of handling a network request for sector access of the client image file. If the client O/S has not then progressed to that point in its boot process, procedure 900 processes that request, in real mode, through Int 13. The remainder of this handler is conventional in nature.

In particular, as shown in start-up sequence 710, upon power-up of the client PC, this PC commences operation using real-mode processing, as symbolized by line 752. This mode of operation persists through downloading and initiation of the boot loader and client hard disk emulation code, i.e., boot file LANHD.IMG; and commencement of loading 32-bit client O/S 690 (e.g., Windows 95 O/S). Here, client hard disk emulation with sector-by-sector downloading is provided by block 620, specifically Int 13 Handler 623 and real-mode NIC driver 625.

Once a file, e.g., Windows 95 file "Win.com", which loads the kernel of the client O/S (i.e., Windows 95 file "VMM32.VXD") has fully loaded and its execution has then been initiated to actually load the O/S kernel, the processing mode of the client PC begins transitioning between real and protected, and continues, as symbolized by line 754, in this transitory state until an Input/Output sub-system (IOS) component within the client O/S has itself initialized. Once this kernel is installed by file "Win.com" and initializes, the kernel then installs and activates various device drivers. LANHDVSD.VXD procedure 245 is one of these drivers. This procedure is compliant with both Int 13 Handler 623 and with the O/S, specifically a network driver (NDIS—network driver interface specification) kernel therein and the IOS. Procedure 245 assures that client hard disk emulation occurs either through the Int 13 Handler or the client O/S, specifically an O/S NDIS (network driver interface specification) transport driver therein, based on the processing state and O/S boot status of the client PC. As shown, procedure 245, which executes as a protected mode driver, contains start-up procedure 800, asynchronous procedures: NDIS check 1000 and Protected Mode Helper 1100, IOS vendor supplied driver 642, and NDIS transport driver 655. The two asynchronous procedures collectively provide, in conjunction with Int 13 Handler 623, seamless client hard disk emulation during the real-protected transitory state. These asynchronous processes, through setting and testing appropriate flags (specifically "NDIS Loaded" and "Need Protected Mode Helper" flags, as discussed in detail below) used as processing state semaphores, collectively control the transition of hard disk requests to the networked client image from the Int 13 Handler to the client O/S depending upon, as the client O/S is then booting, the O/S resources that are then available. In that regard, when sufficient O/S resources become available to permit network access through the client O/S, then the asynchronous procedures permit these requests to be serviced by the NDIS and IOS components of the client O/S rather than by Int 13 Handler 623.

IOS vendor supplied driver 642 binds itself to one of the thirty-two abstraction layers situated within IOS 680. Once this occurs, driver 642 then appropriately handles client hard disk requests that originate with the O/S based on the processing mode of the client at the time: either by effectively invoking Int 13 Handler to process the request (for non-O/S supported network access) or sending the request to the NDIS processes in client O/S (for O/S supported network access).

Specifically, once LANHDVSD.VXD procedure 245 is loaded during the real-protected transitory state, this procedure executes start-up procedure 800. Also, during this state, the client O/S activates other drivers as well. One such driver is NDIS transport driver 655. This driver is a protocol stack that communicates with the NIC through NDIS rather than directly (as occurs with the Int 13 Handler). Since a finite period of time will be needed for an NDIS kernel and the NDIS transport driver to fully activate and this transport driver to bind itself to the NDIS kernel and to IOS 680, start-up procedure 800 will launch Asynchronous Procedure: NDIS check 1000 (which will be discussed in detail below in conjunction with FIG. 10). In essence, once launched, NDIS check procedure 1000 then regularly determines whether an NDIS kernel (here NDIS kernel 660) of the client O/S is then executing. If it is executing, the client O/S will have already switched to the protected mode. Hence, procedure 1000 sets an appropriate status flag to signify that the O/S has entered this mode, as symbolized by line 756, and launches Asynchronous Procedure: Protected Mode Helper 1100. This latter procedure, should the current state of the client-O/S permit, will service any subsequent Int 13 requests for hard disk access through the client O/S, specifically NDIS. Thus, all subsequently accessed client image sectors, occurring in protected mode, will be accommodated through IOS 680; O/S-based network support block 640, specifically through IOS vendor supplied driver 642, NDIS transport driver 655, NDIS kernel 660, and protected-mode NIC driver 673; and NIC 360. Inasmuch as IOS 680, NDIS transport driver 655, NDIS kernel 660, IOS vendor supplied driver 642 and NIC drivers 625 and 673 are all conventional, I will not discuss these in any further detail.

Figure 8:
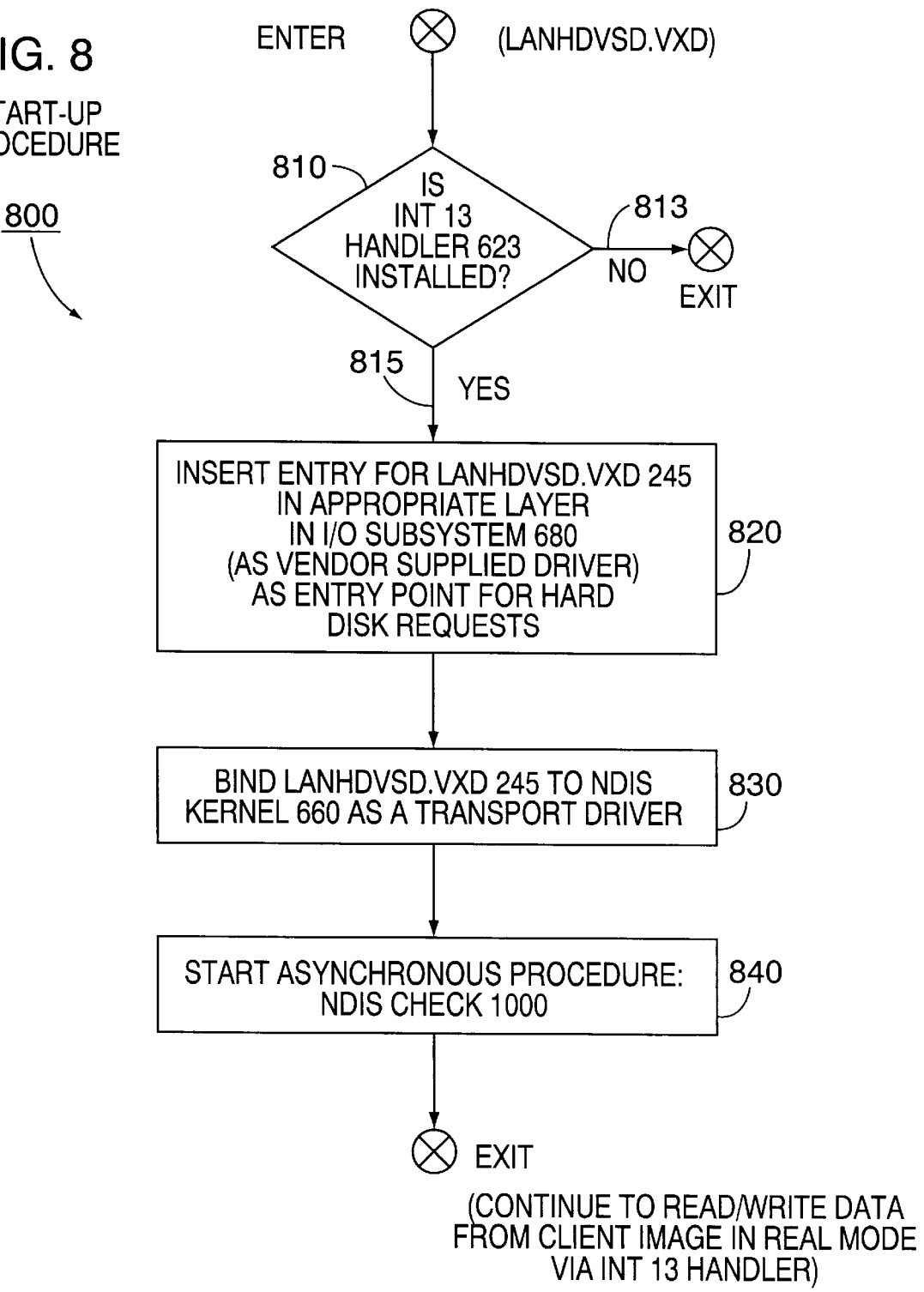
FIG. 8 depicts a flowchart of Start-up Procedure 800 that executes within client PC 10 and specifically for properly starting execution of LANHDVSD.VXD procedure 245 shown in FIG. 6.

FIG. 8 depicts a flowchart of Start-up Procedure 800. As noted above, this procedure properly starts-up execution of LANHDVSD.VXD procedure 245 and its constituent processes.

In particular, upon entry into procedure 800, execution first proceeds to decision block 810. This decision block, when executed, tests whether Int 13 Handler 623 has been installed. If this handler has not yet been installed, then client PC hard disk emulation can not occur. Consequently, execution simply exits from procedure 800, via NO path 813. Alternatively, if this handler is installed, then decision block 810 directs execution, via YES path 815, to block 820. This latter block inserts an entry, as a vendor supplied driver, for procedure 245 into an appropriate layer in IOS 680. This entry, which will be specifically used by IOS vendor supplied driver 642 (as discussed above), is used as an entry point for client hard disk requests. Once this entry point has been created, then execution proceeds to block 830. This block, when executed, binds LANHDVSD.VXD procedure 245, specifically NDIS transport driver 655 therein (see FIG. 6), as a transport driver to NDIS kernel 660. Once this occurs, procedure 800 then executes block 840 which, in turn, starts Asynchronous Procedure: NDIS check 1000. Once this procedure 1000 is started, execution exits from start-up procedure 800.

Figure 9:
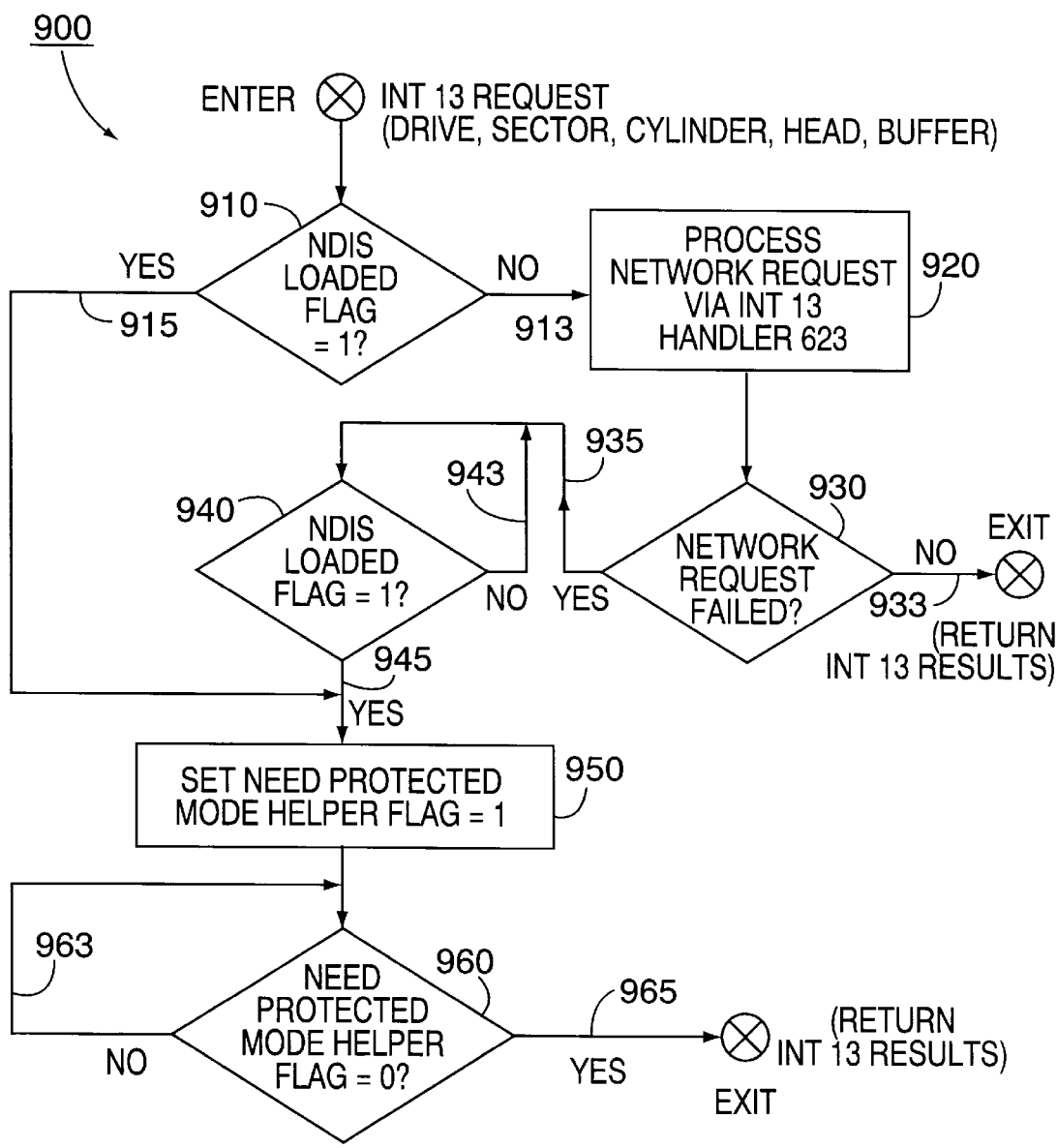
FIG. 9 depicts a flowchart of Real Mode Procedure 900 that executes within client PC 10 and specifically Interrupt (INT) 13 Handler 623 shown in FIG. 6.

FIG. 9 depicts a flowchart of Real Mode Procedure 900 that executes within the client PC and specifically within Int 13 handler 623. As noted above, procedure 900 determines, based on values of status flags, whether the client O/S is then capable of handling a network request for sector access of the client image file. If the client O/S has not then progressed to that point in its boot process, procedure 900 processes that request, in real mode, through Int 13.

In particular, procedure 900 executes at the occurrence of an Int 13 request for a client hard disk access. Such a request specifies a particular drive, sector, cylinder, head and buffer from which stored data is to be read. Upon entry into procedure 900, execution first proceeds to decision block 910. This block, when executed, determines whether an "NDIS Loaded" flag has been set to one, thereby signifying that the NDIS portion of the client O/S has been loaded and is active. If this portion either is not loaded or is not yet fully activated, then decision block 910 routes execution, via NO path 913, to block 920. This latter block, when executed, attempts to service the hard disk request through the Int 13 Handler. Thereafter, execution proceeds to decision block 930 to test whether this attempt was successful. If the request has been successfully serviced over the network through the Int 13 Handler, i.e., the request did not fail, then execution exits from procedure 900, via NO path 933, with the results of that request then being returned.

Alternatively, if the request failed, then decision block 930 routes execution, via YES path 935, to decision block 940. This latter decision block also tests the status of the "NDIS Loaded" flag to determine whether the NDIS portion of the client O/S has now been loaded and is now active. If the NDIS portion either has not been loaded or is not fully active, then execution is fed back, via NO path 943, back to this decision block to await availability of the NDIS portion. If, however, the NDIS portion is loaded and active, then decision block 940 routes execution, via YES path 945, to block 950. This latter block sets the value of a "Need Protected Mode Helper" flag to one. Execution is also directed to block 950 in the event decision block 910 determined that the value of the "NDIS Loaded" flag is set to one, i.e., the NDIS portion is fully active upon entry into procedure 900. Setting the "Need Protected Mode Helper" flag to one at this point indicates that although an Int 13 request is pending, that request requires protected mode processing. Such a need can arise where at the time the request was issued insufficient NDIS resources were active, but subsequently and before the request was handled, those resources became active (by virtue of various NDIS processes having been started, bound and initialized in the interim). Once block 950 sets the value of the "Need Protected Mode Helper" flag, execution proceeds to decision block 960. This latter block tests whether this flag (serving as a semaphore) has been reset to zero by another procedure, i.e., Asynchronous Procedure: Protected Mode Helper 1100, thereby signifying that real mode client hard disk emulation is currently required. As long as the value of the flag remains at one, indicating that protected mode hard disk emulation is to occur through LANHDVSD.VXD, execution will loop back to the decision block to effectively poll this flag, on a routine basis, until its value changes. Alternatively, if the value of the flag is set to zero, hence indicating that real mode disk emulation is needed to handle the current Int 13 request, then execution exits, via YES path 965, from procedure 900 with results of that request, as produced by the Int 13 Handler, then being obtained and returned.

Figure 10:
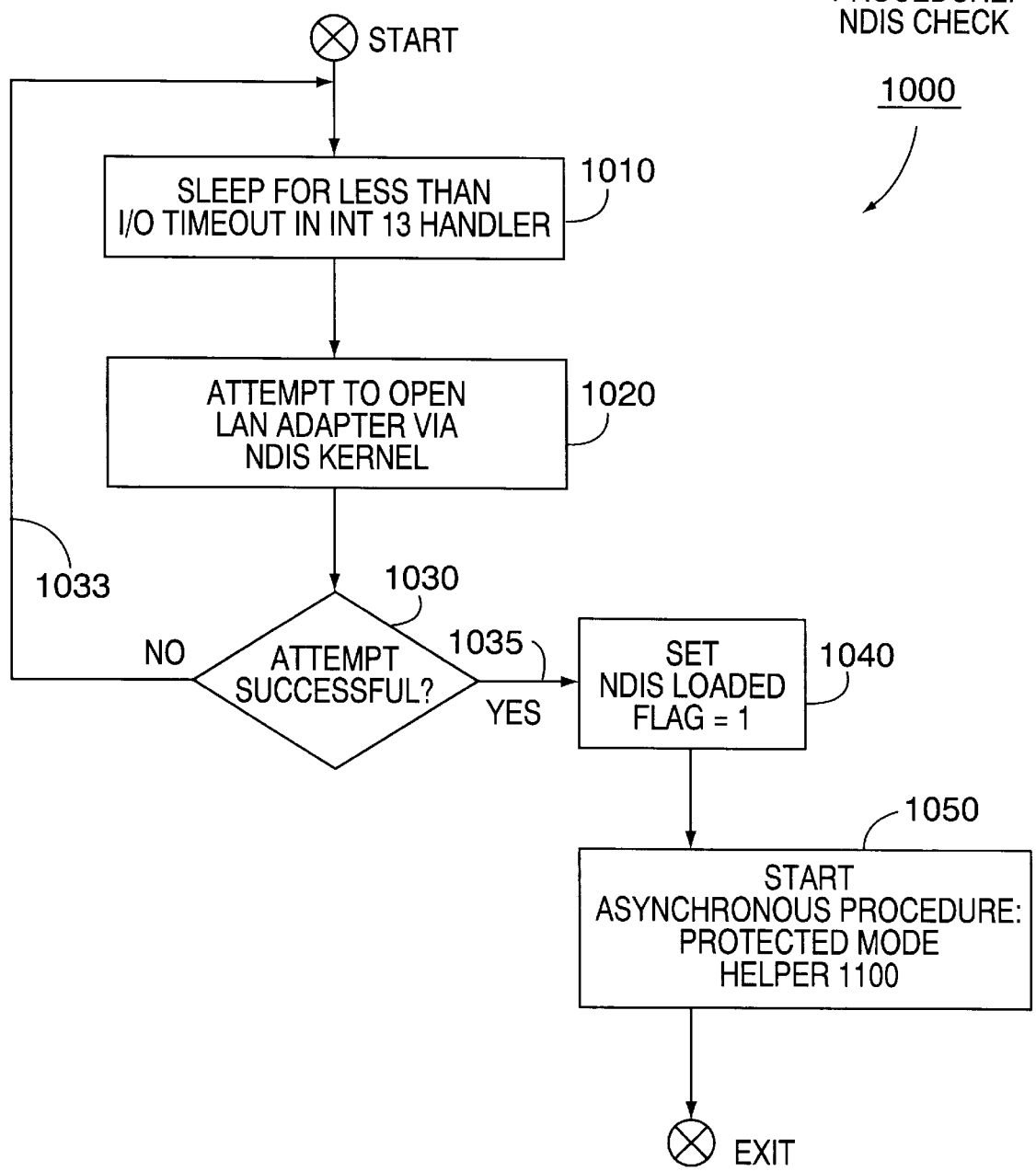
FIG. 10 depicts a flowchart of Asynchronous Procedure: NDIS Check 1000 that executes within client PC 10 and specifically within LANHDVSD.VXD procedure 245 shown in FIG. 6.

FIG. 10 depicts a flowchart of Asynchronous Procedure: NDIS Check 1000. As noted above, this procedure, once launched, regularly determines whether an NDIS kernel of the client O/S is then executing and hence whether the client O/S has switched to the protected mode. If the NDIS kernel is executing, then this procedure sets the "NDIS Loaded" flag, to signify that this O/S state, and launches Asynchronous Procedure: Protected Mode Helper 1100.

In particular, upon entry into procedure 1000, execution first proceeds to block 1010. This block merely waits for a finite interval of time, typically less than a I/O timeout interval for the Int 13 Handler, to elapse. This interval is usually sufficiently long to permit the NDIS kernel and the NDIS transport driver to fully initialize as well as for this transport driver to bind itself to the NDIS kernel and to the IOS. Once this interval has elapsed, execution then proceeds to block 1020. This block attempts to open the LAN adapter (NIC 360) via the NDIS kernel in order to effectuate a client O/S supported network access. Once this attempt is made, decision block 1030 tests whether this attempt was successful. If this attempt was not successful, i.e., appropriate NDIS resources were not then available to facilitate such a network access, then decision block 1030 merely routes execution, via NO path 1033, back to block 1010, and so forth. Alternatively, if this attempt succeeded, then decision block 1030 routes execution, via YES path 1035, to block 1040. This latter block sets the value of "NDIS Loaded" flag to one. Thereafter, execution proceeds to block 1050 which, in turn, starts Asynchronous Procedure: Protected Mode Helper 1100. Once this asynchronous procedure starts, execution exits from procedure 1000.

Figure 11:
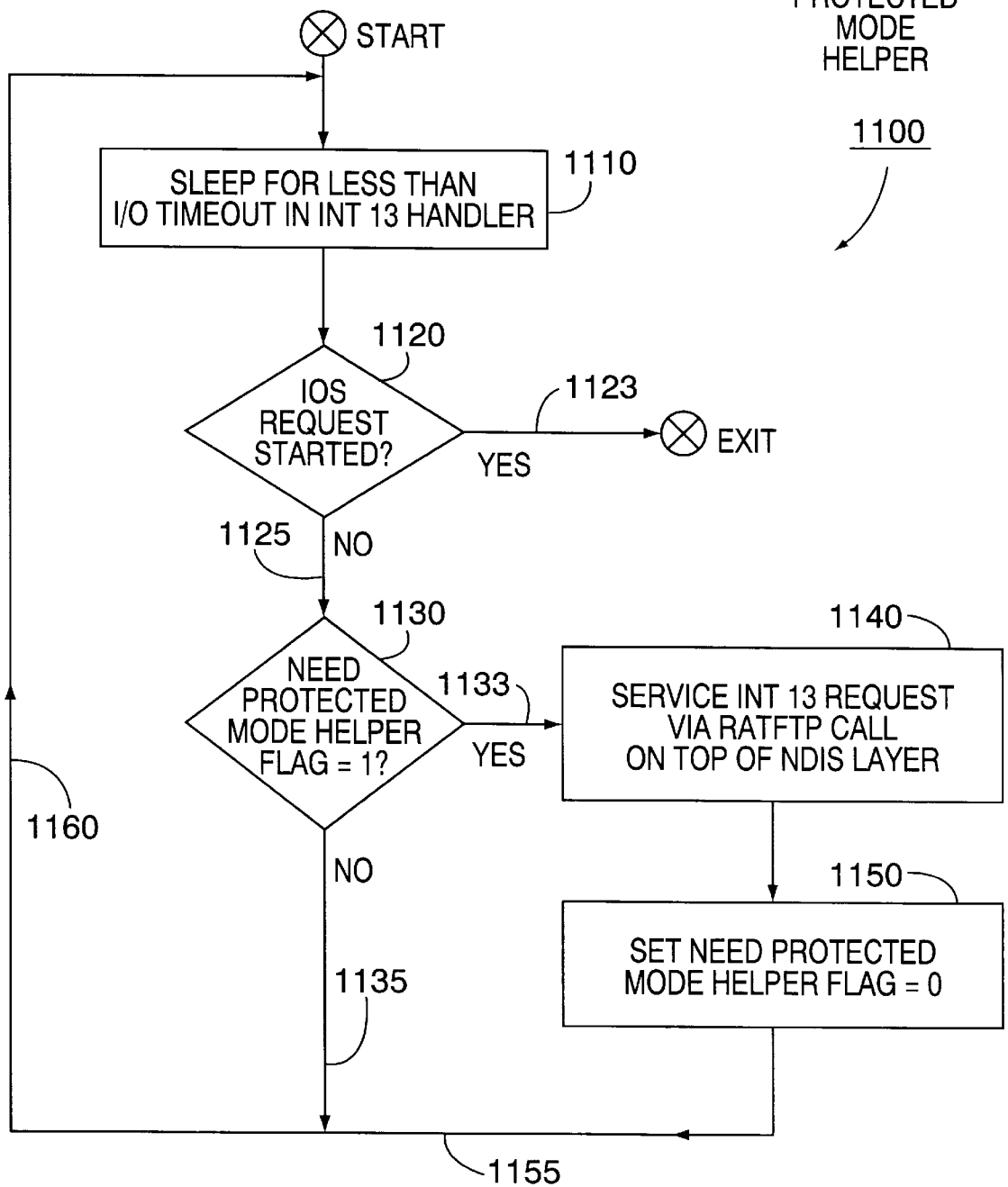
FIG. 11 depicts a flowchart of Asynchronous Procedure: Protected Mode Helper 1100 that executes within client PC 10 and specifically also within LANHDVSD.VXD procedure 245 shown in FIG. 6.

FIG. 11 depicts a flowchart of Asynchronous Procedure: Protected Mode Helper 1100. As noted above, this procedure, should the current state of the client O/S then being booted permit, will service any subsequent Int 13 requests for hard disk access through the client O/S, specifically NDIS.

In particular, upon entry into procedure 1100, execution will first proceed to block 1110. This block merely waits for a finite interval of time, typically less than the I/O timeout interval for the Int 13 Handler, to elapse—here to permit the "Need Protected Mode Helper" flag to be set by Real Mode Procedure 900. Once this interval has elapsed, execution then proceeds to decision block 1120. This block determines whether the client O/S has issued an IOS request for the current access request. If this request has been issued, then execution exits, via YES path 1123, from procedure 1100 such that this request can be processed through the client O/S, specifically NDIS.

Alternatively, if an IOS request has not been issued for the current access request, then decision block 1120 routes execution, via NO path 1125, to decision block 1130. This latter decision block, when executed, tests whether the "Need Protected Mode Helper" flag is set to one. If this flag has been so set, such as through real mode procedure 900, this indicates that O/S boot has sufficiently progressed to the point where client hard disk emulation needs to occur on a protected mode basis with O/S support through LANHD-VSD.VXD. In this instance, decision block 1130 will route execution, via YES path 1133, to block 1140. This latter block, when executed, will service the pending Int 13 request via a RATFTP call through NDIS, effectively providing O/S supported network access. Such an Int 13 request would be pending at this point inasmuch as this flag would have been previously set to one by Real Mode Procedure 900 in response to such a request and if either the NDIS portions of the client O/S, were, during execution of procedure 900, not sufficiently active, or became sufficiently active after routine 900 was just entered. As discussed above, if the "Need Protected Mode Helper" flag is set to one, this indicates that although an Int 13 request is now pending, that request requires protected mode processing. Such a need can arise where at the time the request was issued insufficient NDIS resources were active, but subsequently and before the request was handled, those resources became active (by virtue of various NDIS processes having been started, bound and initialized in the interim). Thereafter, once this Int 13 request is processed, via execution of block 1140 and through NDIS, execution proceeds to block 1150 which, in turn, resets the value of the "Need Protected Mode Helper" flag to zero. Doing so precludes any processing of further Int 13 requests through NDIS. Once block 1150 completes its execution, execution is directed, via paths 1155 and 1160 back to block 1110 to await a next IOS request, and so forth. Execution is also directed to path 1160, via NO path 1135, in the event decision block 1130 determines that the "Need Protected Mode Helper" flag is zero.

As discussed above, my inventive RATFTP server resides on the network server which stores the client PC image file. The RATFTP (random access trivial file transfer protocol) server permits that image file to be accessed on a random access sectorized basis as would be required by the client O/S if that client were to be booted from its local hard disk.

Figure 12:
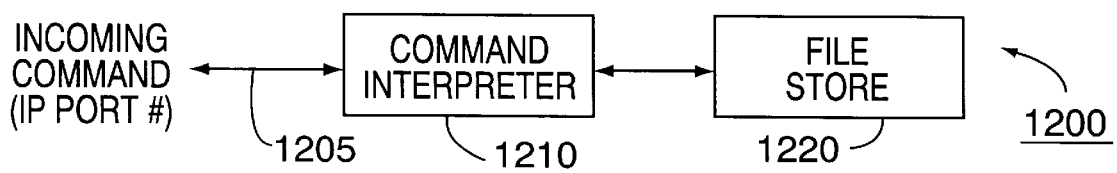
FIG. 12 depicts a high-level block diagram of random access trivial file transfer protocol (RATFTP) server 1200 that forms a part of my present invention.

FIG. 12 depicts a high-level block diagram of RATFTP server 1200. This server is formed of command interpreter 1210 which executes RATFTP commands against file store 1220. In particular, incoming commands bearing a predefined IP port number associated with this server are routed to this server. The server, in turn, then executes those commands to open a desired file stored on the file server and then execute a read and/or write operation to any sector of that file.

The RATFTP server I have invented modifies and extends a conventional TFTP (trivial file transfer protocol) server. In that regard, a conventional TFTP server (note server 402 shown in FIGS. 4A and 4B) implements a simple file transfer utility for downloading an entire file stored on a networked file server, via a TCP/IP connection, to a networked client as well as uploading a complete file, over that connection, from the client to the file server.

However and to the extent relevant here, a TFTP server will only download or upload a complete file—but not any portion of the file let alone a given sector of that file. Inasmuch as TFTP is well known, I will omit any details of TFTP and instead refer the reader to Chapter 19 of the Miller text for further details.

The commands implemented by my inventive RATFTP server are depicted in FIG. 13 by command block 1300. In addition to conventional file read (R) and file write (W) commands 1340 and 1350, respectively, as would be implemented on a TFTP server, the RATFTP server also implements random access read (RAR) and random access write (RAW) commands 1320 and 1330 to implement a read and write operation, respectively, to any sector(s) of a desired file. In response to RATFTP OPEN command 1310, the RATFTP server opens a file and keeps the file open for a duration of session. This, in turn, eliminates a need to successively re-open a file each time a different sector is read from or written into that file. CLOSE command 1360, being implicit in RATFTP server operation, closes a open file then being accessed (read or written) at the end of a session (typically at a session timeout), rather than, as in a conventional TFTP server, at an end of a file (EOF) condition.

Figure 14:
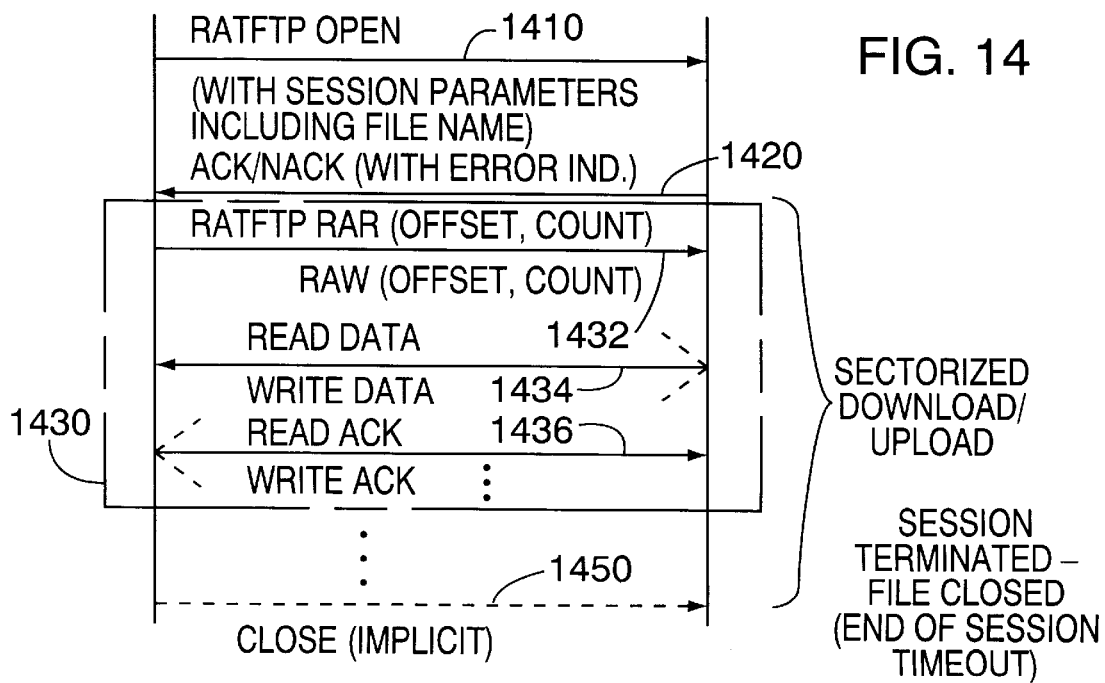
FIG. 14 depicts, at a high-level, sequential message flow that occurs between a client computer (such as a PC or workstation) and an RATFTP server to utilize RATFTP.

With the above in mind regarding my inventive RATFTP server, FIG. 14 depicts, at a high-level, sequential message flow that occurs between a client computer (such as a PC or workstation) and an RAFFTP server to utilize RATFTP.

In particular, a client computer would first issue an RATFTP OPEN command, as symbolized by line 1410, to a network server executing an RATFTP server. This command would contain various session parameters including a name of a given file resident on the network server. Once the RATFTP server received and successfully opened the desired file, that server would generate and send, as symbolized by line 1420, a RATFTP acknowledgement (ACK) packet (or, if the operation was unsuccessful, a negative acknowledgement—NACK—, over the network, back to the client PC. The OPEN command could fail if, e.g., the desired file did not exist on the network server; or, based on the file attributes or permissions, the client PC was not permitted to access that file. Now, assuming that the file was successfully opened, messages 1430 would be repeated as often as needed to download or upload each group of successive sectors on the file between the client computer and the RATFTP server. As indicated within messages 1430, a client computer, based on whether a random access sector read or random access sector write operation was desired, would generate a RATFTP RAR or RATFTP RAW message, with offset and count parameter values therein. The offset parameter specifies, on a relative basis from the start of the file, the first specific sector that is desired to be read or written. The count parameter specifies the number (count) of successive sectors (if any), after the first sector, that is also to be read or written as well. Upon receipt of a RAR command, the RATFTP server will then access the desired sector and download it, via a READ DATA message to the client workstation. Alternatively, upon receipt of a RAW command, the RATFTP server will then access the desired sector and upload a sector, contained in a WRITE DATA message emanating from the client computer to the RATFTP server. The READ DATA and WRITE DATA messages are collectively symbolized by line 1434 with data flow for a RAR command to the client workstation indicated by a solid arrowhead, and with data flow for a RAW command to the RATFTP server indicated by a dashed arrowhead. Once the data is appropriately downloaded into the client PC or uploaded into the RATFTP server, that device issues, as symbolized by line 1436, an appropriate READ or WRITE ACK message back to the originator of the data. Message flow for a READ ACK to the RATFTP server is indicated by a solid arrowhead; message flow for a WRITE ACK to the client computer is indicated by a dashed arrowhead. Messages 1434 and 1436 are repeated for each successive sector to be downloaded or uploaded in a group of successive sectors. Block 1430 is itself repeated for each different group of sectors in a common file. At the end of a session, typically after a session timeout of, e.g., thirty seconds, an RATFTP CLOSE operation, symbolized by dashed line 1450, occurs at the RATFTP server to close the file. Hence, an actual CLOSE command does not need to be issued by the client computer. This timeout value could be changed for a given file, as needed, based, e.g., on the number of client computers then accessing that file or could specified by, e.g., a client as an initialization value in the LANHD.INI file for that client.

By virtue of downloading desired physical sectors of a client PC hard disk image file from a network server to a client computer, hence operating at a physical level of the disk itself, the present invention is independent of and will properly operate with substantially any client file system, whether it is, e.g., FAT, FAT32, HPFS or NTFS.

Furthermore, though I have described my invention in conjunction with use with Windows 95 O/S, those skilled in the art will realize that the teachings of my invention are applicable to use with nearly any client O/S, such as, e.g., 32-bit operating systems, to seamlessly emulate a local hard disk and perform network booting while that O/S, during its boot process, transitions from real to protected processing mode and/or gains ownership of a network adapter in the client.

Although a single embodiment and associated modifications which incorporate the teachings of my present invention have been shown and described in detail herein, those skilled in the art can readily devise many other embodiments and variants thereof that still utilize these teachings.

I claim:

1. A method of booting an operating system (O/S) to a client computer from a network, the network storing an image on a first server, the image having O/S files for the client computer, the method comprising the steps, in the client computer, of:

(a) issuing a corresponding request to the first server to download contents of a corresponding one of each of a plurality of sectors residing on the first server so as to form a plurality of requests, wherein:
      (a1) said sectors collectively store an image file which contains the image; and
      (a2) the first server emulates, in response to said plurality of requests, behavior of a disk drive on the client computer such that contents of individual physical sectors of the image file specified in corresponding ones of the requests are accessed by the first server on a sector-by-sector basis from a disk drive associated with the first server and downloaded, via the network, to the client computer, and wherein the corresponding request issuing step comprises the steps of:

(a3) generating a request, to the first server, to download a boot sector contained in the image file; and (a4) executing the boot sector, once the boot sector is downloaded from the first server, so as to subsequently generate each of said plurality of requests such that the client computer receives, on a sector-by-sector basis from the first server, the contents of the individual physical sectors that collectively comprise client O/S files;

(b) storing the contents of each of said sectors received from the first server; and (c) activating client O/S processes embodied by the contents of said sectors stored on the client computer.

2. The method in claim 1 wherein said corresponding request issuing step, in the client computer, further comprises the step of:

obtaining, from a second server, an address of the image file stored on the first server.

3. The method in claim 2 further comprising the step, in the client computer, of obtaining a boot file from a second network server, the boot file comprising real-mode client disk emulation code; and wherein the request generating step comprises the step of producing the boot sector download request through executing the boot file, wherein the boot sector request contains an identification of the first server and the name of the image file.

4. The method in claim 3 wherein the first and second servers are the same server or different servers connected to the network.

5. The method in claim 3 further comprising the step of providing the client disk emulation, on a sectorized basis, while a processing mode of the client computer changes from real to protected and the client O/S takes ownership of a network interface situated in the client computer and connected to the network.

6. The method in claim 5 further comprising the step, in the client computer, of:

downloading, as part of the image file, a transport driver; and executing, as one of the client O/S processes, the transport driver such that each of the client disk access requests, generated by the client computer while the client O/S is being booted, is directed to the first server so as to retrieve contents of a corresponding sector of the image file stored on the first server in lieu of accessing a sector associated with a disk locally situated at the client computer, whereby, through use of the transport driver and while the client O/S is being booted, an actual source of the contents of the sectors remains transparent to the client O/S.

7. The method in claim 6 wherein the transport driver execution step further comprising the steps of:

while the client computer is operating in the real processing mode, handling client disk access operations through a real mode interrupt handler procedure so as to generate ones of the plurality of requests;

while the client computer is operating in the protected mode, handling client disk access operations through pre-defined client O/S network procedures so as to generate subsequent ones of the plurality of requests;

detecting, as the client O/S processes are being activated, a transition in the client processing mode from real to protected; and during the transition, controlling a changeover in handling client disk access operations from the real mode interrupt handling procedure to the client O/S network procedures to generate said subsequent ones of the plurality of requests.

8. The method in claim 7 wherein the controlling step comprises the step of controlling the changeover based on whether sufficient active resources then exist in client O/S as it is booting.

9. The method in claim 7 wherein the detecting step comprises the step of employing a semaphore-based procedure for detecting said transition in the client processing mode.

10. The method in claim 7 further comprising the steps, in the client computer, of:

executing predefined boot code stored in the client computer which, in response thereto, broadcasts a client IP (Internet protocol) request message on the network, said client IP request message containing an address of the network interface situated in the client computer;

obtaining, from the second server, a reply message to the client IP request message, wherein the reply message contains an IP address assigned to the client computer, an IP address of the first server and an address of the boot file stored on the second server, wherein the boot file contains the real-mode client disk emulation code and a name of an initialization file;

downloading the boot file from the second server;

executing the emulation code contained in the boot file, once it has been downloaded, so as to initiate real-mode client disk emulation through the second server and thereafter to download the initialization file from the second server, wherein the initialization file contains an address of the image file residing on the first server and an address of the first server; and downloading, from the first server and in response to execution of the boot file in conjunction with the initialization file, a boot sector contained within the image file;

issuing, as a result of executing the boot sector, each of said plurality of requests, to the second server, to download the contents of the plurality of corresponding sectors that collectively store the image file; and starting execution of various client O/S processes in the client computer as sufficient O/S files are downloaded on a sector-by-sector basis from the image file stored on the first server.

11. The method in claim 10 wherein the plurality of requests issuing step comprises the step of generating a separate random access trivial file transfer protocol (RATFTP) read request message to an RATFTP server in the first server in order to download a corresponding one of the sectors of the image file, wherein the RATFTP server implements sectorized access to the image file.

12. The method in claim 10 wherein the controlling step comprises the step of controlling the changeover based on whether sufficient active resources then exist in client O/S as it is booting.

13. The method in claim 10 wherein the detecting step comprises the step of employing a semaphore-based procedure for detecting said transition in the client processing mode.

14. The method in claim 10 wherein the first and second servers are the same server or different servers connected to the network.

15. The method in claim 5 further comprising the steps, in the client computer, of:

executing predefined boot code stored in the client computer which, in response thereto, broadcasts a client IP (Internet protocol) request message on the network, said client IP request message containing an address of the network interface situated in the client computer;

obtaining, from the second server, a reply message to the client IP request message, wherein the reply message contains an IP address assigned to the client computer, an IP address of the first server and an address of the boot file stored on the second server, wherein the boot file contains the real-mode client disk emulation code and a name of an initialization file;

downloading the boot file from the second server;

executing the emulation code contained in the boot file, once it has been downloaded, so as to initiate real-mode client disk emulation through the second server and thereafter to download the initialization file from the second server, wherein the initialization file contains an address of the image file residing on the first server and an address of the first server; and downloading, from the first server and in response to execution of the boot file in conjunction with the initialization file, a boot sector contained within the image file;

issuing, as a result of executing the boot sector, each of said plurality of requests, to the second server, to download the contents of the plurality of corresponding sectors that collectively store the image file; and starting execution of various client O/S processes in the client computer as sufficient O/S files are downloaded on a sector-by-sector basis from the image file stored on the first server.

16. The method in claim 15 wherein the plurality of requests issuing step comprises the step of generating a separate random access trivial file transfer protocol (RATFTP) read request message to an RATFTP server in the first server in order to download a corresponding one of the sectors of the image file, wherein the RATFTP server implements sectorized access to the image file.

17. The method in claim 15 wherein the first and second servers are the same server or different servers connected to the network.

18. Apparatus for booting an operating system (O/S) to a client computer from a network, the network storing an image on a first server, the image having O/S files for the client computer, the apparatus comprising a client computer having;

(a) a processor; and (b) a memory, connected to the processor, for storing executable computer instructions therein; and (c) wherein the processor, in response to the instructions:

(c1) issues a corresponding request to the first server to download contents of a corresponding one of each of a plurality of sectors residing on the first server so as to form a plurality of requests, wherein:

(c1a) said sectors collectively store an image file which contains the image; and (c1b) the first server emulates, in response to said plurality of requests, behavior of a disk drive on the client computer such that contents of individual physical sectors of the image file specified in corresponding ones of the requests are accessed by the first server on a sector-by-sector basis from a disk drive associated with the first server and downloaded, via the network, to the client computer, and wherein the processor further:

(c1c) generates a request, to the first server, to download a boot sector contained in the image file; and (c1d) executes the boot sector, once the boot sector is downloaded from the first server, so as to subsequently generate each of said plurality of requests such that the client computer receives, on a sector-by-sector basis from the first server, the contents of the individual physical sectors that collectively comprise client O/S files;

(c2) stores the contents of each of said sectors received from the first server; and (c3) activates client O/S processes embodied by the contents of said sectors stored on the client computer.

19. The apparatus in claim 18 wherein the processor, in response to the executable instructions:

obtains, from a second server, an address of the image file stored on the first server.

20. The apparatus in claim 19 wherein the processor, in response to the executable instructions:

obtains a boot file from a second network server, the boot file comprising real-mode client disk emulation code; and produces the boot sector download request through executing the boot file, wherein the boot sector request contains an identification of the first server and the name of the image file.

21. The apparatus in claim 20 wherein the first and second servers are the same server or different servers connected to the network.

22. The apparatus in claim 20 wherein the image comprises client O/S files and application program files.

23. The apparatus in claim 20 wherein the first server provides the client disk emulation, on a sectorized basis, while a processing mode of the client computer changes from real to protected and the client O/S takes ownership of a network interface situated in the client computer and connected to the network.

24. The apparatus in claim 23 wherein the processor, in response to the executable instructions:

downloads, as part of the image file, a transport driver; and executes, as one of the client O/S processes, the transport driver such that each of the client disk access requests, generated by the client computer while the client O/S is being booted, is directed to the first server so as to retrieve contents of a corresponding sector of the image file stored on the first server in lieu of accessing a sector associated with a disk locally situated at the client computer, whereby, through use of the transport driver and while the client O/S is being booted, an actual source of the contents of the sectors remains transparent to the client O/S.

25. The apparatus in claim 24 wherein the processor, in response to the executable instructions:

handles, while the client computer is operating in the real processing mode, client disk access operations through a real mode interrupt handler procedure so as to generate ones of the plurality of requests;

handles, while the client computer is operating in the protected mode, client disk access operations through pre-defined client O/S network procedures so as to generate subsequent ones of the plurality of requests;

detects, as the client O/S processes are being activated, a transition in the client processing mode from real to protected; and during the transition, controls a changeover in handling client disk access operations from the real mode interrupt handling procedure to the client O/S network procedures to generate said subsequent ones of the plurality of requests.

26. The apparatus in claim 25 wherein the pre-defined client O/S network procedures comprise an input/output subsystem (IOS) process and network driver interface specification (NDIS) process.

27. The apparatus in claim 25 wherein the processor, in response to the executable instructions, controls the changeover based on whether sufficient active resources then exist in client O/S as it is booting.

28. The apparatus in claim 25 wherein processor, in response to the executable instructions, employs a semaphore-based procedure for detecting said transition in the client processing mode.

29. The apparatus in claim 25 wherein the processor, in response to the executable instructions:

executes predefined boot code stored in the client computer which, in response thereto, broadcasts a client IP (Internet protocol) request message on the network, said client IP request message containing an address of the network interface situated in the client computer;

obtains, from the second server, a reply message to the client IP request message, wherein the reply message contains an IP address assigned to the client computer, an IP address of the first server and an address of the boot file stored on the second server, wherein the boot file contains the real-mode client disk emulation code and a name of an initialization file;

downloads the boot file from the second server;

executes the emulation code contained in the boot file, once it has been downloaded, so as to initiate real-mode client disk emulation through the second server and thereafter to download the initialization file from the second server, wherein the initialization file contains an address of the image file residing on the first server and an address of the first server; and downloads, from the first server and in response to execution of the boot file in conjunction with the initialization file, a boot sector contained within the image file;

issues, as a result of executing the boot sector, each of said plurality of requests, to the second server, to download the contents of the plurality of corresponding sectors that collectively store the image file; and starts execution of various client O/S processes in the client computer as sufficient O/S files are downloaded on a sector-by-sector basis from the image file stored on the first server.

30. The apparatus in claim 29 wherein the processor, in response to the executable instructions, generates a separate random access trivial file transfer protocol (RATFTP) read request message to an RATFTP server in the first server in order to download a corresponding one of the sectors of the image file, wherein the RATFTP server implements sectorized access to the image file.

31. The apparatus in claim 29 wherein the pre-defined client O/S network procedures comprise an input/output subsystem (IOS) process and network driver interface specification (NDIS) process.

32. The apparatus in claim 29 wherein the processor, in response to the executable instructions, controls the changeover based on whether sufficient active resources then exist in client O/S as it is booting.

33. The apparatus in claim 29 wherein the processor, in response to the executable instructions, employs a semaphore-based procedure for detecting said transition in the client processing mode.

34. The apparatus in claim 29 wherein the first and second servers are the same server or different servers connected to the network.

35. The apparatus in claim 29 wherein the image comprises client O/S files and application program files.

36. The apparatus in claim 23 wherein the processor, in response to the executable instructions:

executes predefined boot code stored in the client computer which, in response thereto, broadcasts a client IP (Internet protocol) request message on the network, said client IP request message containing an address of the network interface situated in the client computer;

obtains, from the second server, a reply message to the client IP request message, wherein the reply message contains an IP address assigned to the client computer, an IP address of the first server and an address of the boot file stored on the second server, wherein the boot file contains the real-mode client disk emulation code and a name of an initialization file;

downloads the boot file from the second server;

executes the emulation code contained in the boot file, once it has been downloaded, so as to initiate real-mode client disk emulation through the second server and thereafter to download the initialization file from the second server, wherein the initialization file contains an address of the image file residing on the first server and an address of the first server; and downloads, from the first server and in response to execution of the boot file in conjunction with the initialization file, a boot sector contained within the image file;

issues, as a result of executing the boot sector, each of said plurality of requests, to the second server, to download the contents of the plurality of corresponding sectors that collectively store the image file; and starts execution of various client O/S processes in the client computer as sufficient O/S files are downloaded on a sector-by-sector basis from the image file stored on the first server.

37. The apparatus in claim 36 wherein the processor, in response to the executable instructions, generates a separate random access trivial file transfer protocol (RATFTP) read request message to an RATFTP server in the first server in order to download a corresponding one of the sectors of the image file, wherein the RATFTP server implements sectorized access to the image file.

38. The apparatus in claim 36 wherein the first and second servers are the same server or different servers connected to the network.

39. The apparatus in claim 36 wherein the image comprises client O/S files and application program files.

* * * * *